US012067646B2

(12) United States Patent
Zhang et al.

(10) Patent No.: US 12,067,646 B2
(45) Date of Patent: Aug. 20, 2024

(54) CROSS-MODAL CONTRASTIVE LEARNING FOR TEXT-TO-IMAGE GENERATION BASED ON MACHINE LEARNING MODELS

(71) Applicant: Google LLC, Mountain View, CA (US)

(72) Inventors: Han Zhang, Sunnyvale, CA (US); Jing Yu Koh, Singapore (SG); Jason Michael Baldridge, Austin, TX (US); Yinfei Yang, Sunnyvale, CA (US); Honglak Lee, Ann Arbor, MI (US)

(73) Assignee: Google LLC, Mountain View, CA (US)

( * ) Notice: Subject to any disclaimer, the term of this patent is extended or adjusted under 35 U.S.C. 154(b) by 540 days.

(21) Appl. No.: 17/467,628

(22) Filed: Sep. 7, 2021

(65) Prior Publication Data

US 2023/0081171 A1 Mar. 16, 2023

(51) Int. Cl.
| | | |
|---|---|---|
| *G06T 11/00* | (2006.01) | |
| *G06F 18/214* | (2023.01) | |
| *G06F 18/22* | (2023.01) | |
| *G06N 3/08* | (2023.01) | |
| *G10L 15/26* | (2006.01) | |

(52) U.S. Cl.
CPC .......... *G06T 11/00* (2013.01); *G06F 18/2148* (2023.01); *G06F 18/22* (2023.01); *G06N 3/08* (2013.01); *G10L 15/26* (2013.01)

(58) Field of Classification Search
CPC ...... G06T 11/00; G06F 18/2148; G06F 18/22; G06N 3/08; G06N 3/045; G06N 3/0475; G06N 3/094; G10L 15/26; G06V 10/82
See application file for complete search history.

(56) References Cited

U.S. PATENT DOCUMENTS

| | | | | |
|---|---|---|---|---|
| 9,367,763 | B1* | 6/2016 | Gordo Soldevila | .... G06F 16/50 |
| 10,713,821 | B1* | 7/2020 | Surya | ...................... G06N 3/045 |
| 11,756,567 | B2* | 9/2023 | Wilson | .................... G06N 3/045 |
| | | | | 704/235 |
| 2018/0173996 | A1* | 6/2018 | Lim | ........................ G06N 3/084 |
| 2019/0205435 | A1* | 7/2019 | Kashyap | .............. G06V 10/761 |
| 2021/0118447 | A1* | 4/2021 | Kim | ..................... G06F 40/30 |
| 2021/0158503 | A1* | 5/2021 | Li | ........................ G06F 18/214 |
| 2021/0158815 | A1* | 5/2021 | Lee | ....................... G06V 10/764 |
| 2021/0232705 | A1* | 7/2021 | Chandelier | ............ G06N 3/088 |

(Continued)

OTHER PUBLICATIONS

Hinz, "Generating Multiple Object at Spatially Distinct Locations", ICLR (2019).

(Continued)

*Primary Examiner* — Solomon G Bezuayehu
(74) *Attorney, Agent, or Firm* — McDonnell Boehnen Hulbert & Berghoff LLP

(57) ABSTRACT

A computer-implemented method includes receiving, by a computing device, a particular textual description of a scene. The method also includes applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair. The method further includes predicting the output image rendition of the scene.

20 Claims, 15 Drawing Sheets

(56) References Cited

U.S. PATENT DOCUMENTS

| | | | |
|---|---|---|---|
| 2022/0005235 A1* | 1/2022 | Gou | G06T 11/203 |
| 2022/0277038 A1* | 9/2022 | Li | G06V 10/454 |
| 2023/0215162 A1* | 7/2023 | Kim | G06V 10/86 |
| | | | 382/157 |
| 2023/0260164 A1* | 8/2023 | Yuan | G06N 20/00 |
| | | | 382/157 |
| 2023/0274479 A1* | 8/2023 | Choi | G06F 40/30 |
| | | | 345/629 |

OTHER PUBLICATIONS

Hong et al., "Inferring Semantic Layout for Hierarchical Text-to-Image Synthesis", arXiv:1801.05091v2 [cs.CV] (2018).
Koh et al., "Text-to-Image Generation Grounded by Fine-Grained User Attnetion" IEEE Xplore (2021).
Liang et al., "CPGAN: Full-Spectrum-Content-Parsing Generative Adversarial Networks for Text-to-Image Synthesis", arXiv:1912.08562v1 [cs.CV] (2019).
Reed et al., "Generative Adversarial Text to Image Synthesis", Proceedings of the 33rd International Conference on Machine Learning, vol. 48 (2016).
Xu et al., "AttnGAN: Fine-Grained Text to Image Generation with Attentional Generative Adversarial Networks" [CVPR2018].
Zhang et al., "Cross-Modal Contrastive Learning for Text-to-Image Generation" arXiv:2101.04702v4 [cs.CV] (2021).
Zhang et al., "StackGAN: Text to Photo-realistic Image Synthesis with Stacked Generative Adversarial Networks" IEEE Xplore.
Bau et al., "Paint by Word", arXiv:2103.10951v2 [cs.CV] (2021).

* cited by examiner

| Dataset 4R1 | COCO-14 4C1 | | LN-COCO 4C2 | | LN-OpenImages 4C3 | |
| --- | --- | --- | --- | --- | --- | --- |
| | train | val | train | val | train | val |
| # Samples 4R2 | 82k | 40k | 134k | 8k | 507k | 41k |
| caption/image 4R3 | 5 | | 1 | | 1 | |
| avg. caption length 4R4 | 10.5 | | 42.1 | | 35.6 | |

FIG. 4

| | Model 5C1 | IS 5C2 | FID 5C3 | R-prec (CC) 5C4 | SOA-C 5C5 | SOA-I 5C6 |
| --- | --- | --- | --- | --- | --- | --- |
| 5R1 | Real Images | 34.88 | 6.09 | 69.36 | 74.97 | 80.84 |
| 5R2 | AttnGAN | 23.61 | 33.10 | -- | 25.88 | 39.01 |
| 5R3 | Obj-GAN | 24.09 | 36.52 | -- | 27.14 | 41.24 |
| 5R4 | DM-GAN | 32.32 | 27.34 | -- | 33.44 | 48.03 |
| 5R5 | OP-GAN | 27.88 | 24.70 | 49.80 | 35.85 | 50.47 |
| 5R6 | SD-GAN | 35.69 | 29.35 | 51.68 | -- | -- |
| 5R7 | CP-GAN | 52.73 | 55.82 | 59.05 | 77.02 | 84.55 |
| 5R8 | XMC-GAN | 30.45 | 9.33 | 71.00 | 50.94 | 71.33 |

FIG. 5

| | 8C1 | 8C2 | 8C3 | 8C4 |
|---|---|---|---|---|
| | LN-COCO CAPTION | ATTN-GAN | TReCS | XMC-GAN |
| There is a group of people. They are standing on a ski board. They are holding sticks. The person at the center is wearing a helmet. On the right side ... | | | | |
| This picture shows an inner view of a restroom. We see a wash basin with a tap and a mirror on the wall and we see a light on it and we see a toilet seat and a frame on the wall and ... | | | | |
| In this image we can see a red colored train on the railway track. Here we can see a platform. | | | | |
| In this picture there are two members lying on the bench in the sand under an umbrella. There are some people standing here. In the background there is water | | | | |

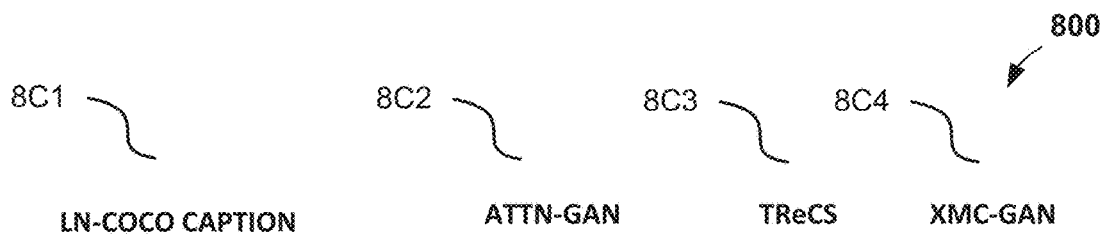
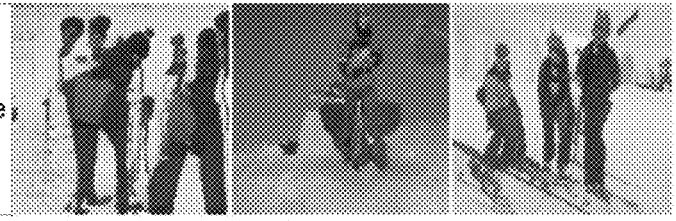
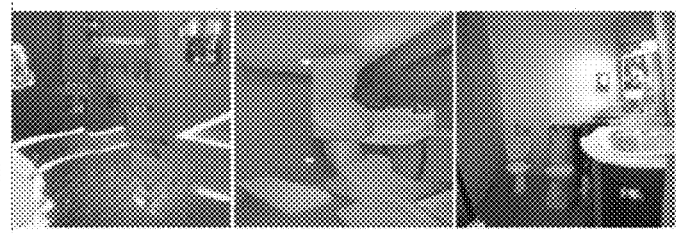
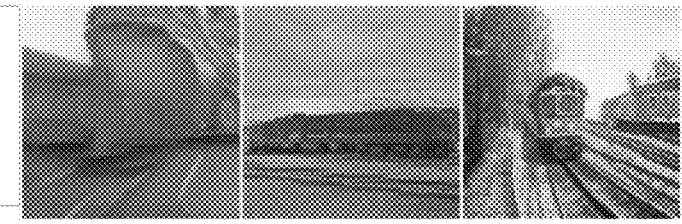
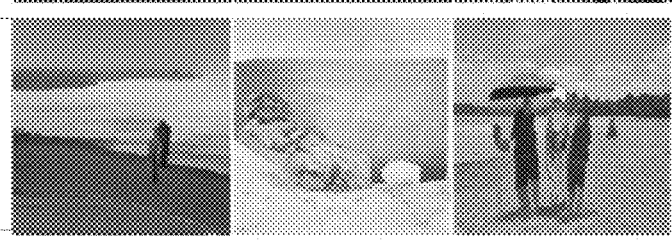

FIG. 8

| | Model | IS | FID | R-prec (CC) | SOA-C | SOA-I |
|---|---|---|---|---|---|---|
| | Real Images | 34.40 | 8.01 | 61.52 | 66.08 | 67.39 |
| 9R2 | AttnGAN | 20.80 | 51.80 | 43.88 | -- | -- |
| 9R3 | TReCS | 21.30 | 48.70 | 37.88 | -- | -- |
| 9R4 | XMC-GAN | 28.37 | 14.12 | 66.92 | 36.76 | 48.14 |

FIG. 9

| S | W | I | IS | FID | R-prec (CC) | SOA-C | SOA-I |
|---|---|---|---|---|---|---|---|
| | | Real Images | 34.88 | 6.09 | 69.36 | 76.17 | 80.12 |
| | | Baseline | 15.89 | 39.28 | 21.41 | 8.99 | 25.72 |
| ✓ | | | 23.50 | 19.25 | 53.57 | 24.57 | 45.41 |
| | ✓ | | 20.72 | 24.38 | 44.42 | 20.50 | 39.12 |
| | | D | 18.90 | 29.71 | 31.16 | 12.73 | 30.89 |
| | | VGG | 21.54 | 39.58 | 35.89 | 17.41 | 35.08 |
| | | D + VGG | 23.61 | 21.14 | 47.04 | 23.87 | 44.41 |
| ✓ | ✓ | | 26.02 | 14.25 | 64.94 | 30.49 | 51.60 |
| ✓ | ✓ | D | 28.06 | 12.96 | 65.36 | 34.21 | 54.23 |
| ✓ | ✓ | VGG | 30.55 | 11.12 | 70.98 | 39.36 | 59.10 |
| ✓ | ✓ | D + VGG | 30.66 | 11.93 | 69.86 | 39.85 | 59.78 |

FIG. 10

| 1100 | 11C1 | 11C2 | 11C3 | 11C4 | 11C5 | 11C6 |
|---|---|---|---|---|---|---|
| Modulation | IS | FID | R-prec (CC) | SOA-C | SOA-I |
| Self-Modulation 11R1 | 28.98 | 13.59 | 64.65 | 35.18 | 55.54 |
| Attentional Self-Modulation 11R2 | 30.66 | 11.93 | 69.86 | 39.85 | 59.78 |
FIG. 11
| 1200 | 12C1 | 12C2 | 12C3 | 12C4 | 12C5 | 12C6 |
|---|---|---|---|---|---|---|
| VGG Loss | IS | FID | R-prec (CC) | SOA-C | SOA-I |
| $l_2$ loss 12R1 | 12.46 | 52.86 | 22.62 | 8.27 | 25.48 |
| Contrastive (InfoNCE) loss 12R2 | 21.54 | 39.58 | 35.89 | 17.41 | 35.08 |
FIG. 12
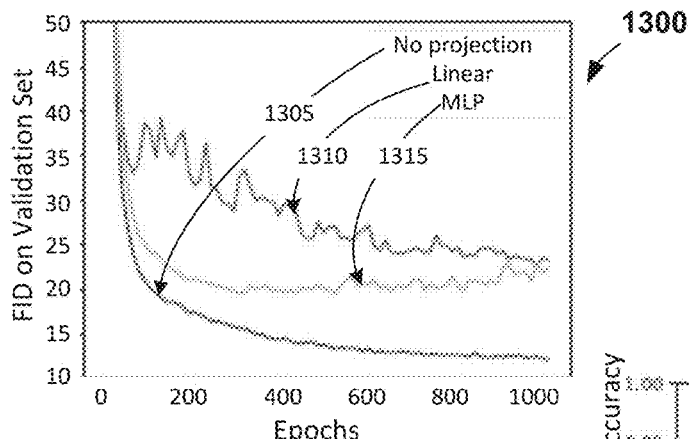
FIG. 13
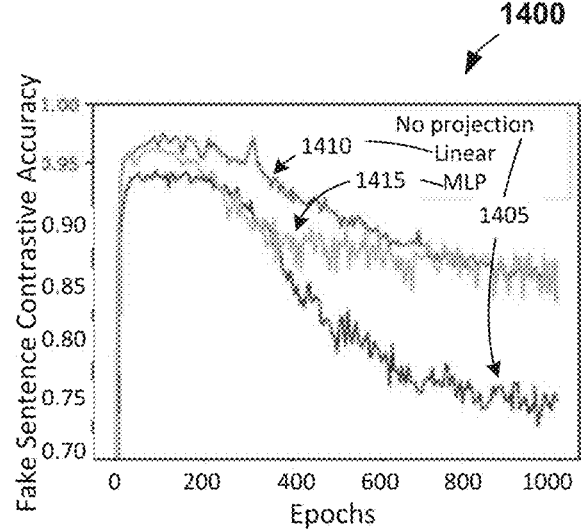
FIG. 14

1900

1910 Receiving, by a computing device, training data comprising a plurality of textual descriptions, and one or more image renditions associated with each of the plurality of textual descriptions 1920 Training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the training of the neural network includes determining a plurality of contrastive losses corresponding to the plurality of corresponding pairs, and wherein the mutual information is based on the plurality of contrastive losses 1930 Outputting the trained neural network for text-to-image generation

2010 Receiving, by a computing device, a particular textual description of a scene 2020 Applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair 2030 Predicting the output image rendition of the scene

FIG. 20

CROSS-MODAL CONTRASTIVE LEARNING FOR TEXT-TO-IMAGE GENERATION BASED ON MACHINE LEARNING MODELS

BACKGROUND

Neural networks can be trained to synthesize an image based on textual description. Coherence, clarity, and photorealistic scenes with high semantic fidelity to a conditioned textual description, are some expected characteristics of an output of such text-to-image synthesis systems.

Compared to inputs such as sketches and object masks, descriptive sentences are an intuitive and flexible way to express visual concepts for generating images. The main challenge for text-to-image synthesis lies in learning from unstructured description, and handling the different statistical properties between vision and language inputs.

Generating images from text descriptions has been improved with deep generative models, including pixel convolutional neural networks (pixelCNNs), approximate Langevin sampling, variational autoencoders (VAEs), and Generative Adversarial Networks (GANs). GAN-based models in particular have provided better sample quality. For example, conditional GANs have been used for text to image generation. StackGAN, that includes two GANs that are stacked together, improves conditional GANs with a coarse-to-fine framework that progressively generates images at different resolutions for high-resolution synthesis. Attentional GAN (AttnGAN) introduces cross-modal attention to better capture details. Dynamic Memory GAN (DM-GAN) adaptively refines generated images with a memory module that writes and reads text and image features. MirrorGAN enforces text-image consistency via caption generation on the generated images. Structural and Denoising GAN (SD-GAN) proposes word-level conditional batch normalization and dual encoder structure with triplet loss to improve text-image alignment. Content Parsing GAN (CP-GAN) proposes an object-aware image encoder and fine-grained discriminator. Its generated images obtain high Inception Score (IS); however, there may be drawbacks in performance when evaluated with the Fréchet Inception Distance (FID) metric, and in human evaluations.

To generate a final high-resolution image, such approaches generally rely on multiple generators and discriminators to generate images at different resolutions. Some hierarchical models can explicitly generate different objects after inferring semantic layouts. A drawback of such models is that they need fine-grained object labels (e.g., object bounding boxes or segmentation maps), thereby making generation a multi-step process.

Contrastive learning is another useful scheme for self-supervised representation learning. It enforces consistency of image representations under different augmentations by contrasting positive pairs with negative pairs. Adversarial training scenarios may be used in this context. For example, a contrastive loss can be used as regularization on image for unconditional image generation. Contrastive learning may also be used for class-conditional image generation. Some models add contrastive learning to enforce disentanglement for face generation. For example, patch-based contrastive learning may be used for image-to-image translation by using positive pairs from the same image location in input and output images.

Generative Adversarial Networks (GANs) generally produce high quality output results in text-to-image generation, using a conditional GAN formulation. AttnGAN proposes a multi-stage refinement framework to generate fine-grained details by attending to relevant words in the description. These models may be able to generate high fidelity images on single domain datasets (e.g., birds, flowers, etc.), but are not as successful on complex scenes with many objects, such as, for example the images in the MICROSOFT® Common Objects in Context (MS-COCO) dataset. Some methods propose object-driven, hierarchical approaches that explicitly model object instances within an image. Given the text description, such methods first inter a semantic layout (e.g., object bounding boxes, segmentation masks, and/or both), and then generate an image from the layout. These hierarchical methods are cumbersome to apply to real-world scenarios, image generation is a multi-step process (box-to-mask-to-image), and the model requires much more fine-grained object labels to train.

SUMMARY

In a first aspect, a computer-implemented method is provided. The method includes receiving, by a computing device, training data comprising a plurality of textual descriptions, and one or more image renditions associated with each of the plurality of textual descriptions. The method also includes training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the plurality of corresponding pairs comprise an image-to-image pair and a text-to-image pair, wherein the training of the neural network comprises determining a plurality of contrastive losses corresponding to the plurality of corresponding pairs, and wherein the mutual information is based on the plurality of contrastive losses. The method further includes outputting the trained neural network for text-to-image generation.

In a second aspect, a computing device is provided. The computing device includes one or more processors and data storage. The data storage has stored thereon computer-executable instructions that, when executed by one or more processors, cause the computing device to carry out functions. The functions include: receiving, by a computing device, training data comprising a plurality of textual descriptions, and one or more image renditions associated with each of the plurality of textual descriptions; training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the plurality of corresponding pairs comprise an image-to-image pair and a text-to-image pair, wherein the training of the neural network comprises determining a plurality of contrastive losses corresponding to the plurality of corresponding pairs, and wherein the mutual information is based on the plurality of contrastive losses; and outputting the trained neural network for text-to-image generation.

In a third aspect, a computer program is provided. The computer program includes instructions that, when executed by a computer, cause the computer to carry out functions.

The functions include: receiving, by a computing device, training data comprising a plurality of textual descriptions, and one or more image renditions associated with each of the plurality of textual descriptions; training a neural network for text-to-image generation based on the trainine data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the plurality of corresponding pairs comprise an image-to-image pair and a text-to-image pair, wherein the training of the neural network comprises determining a plurality of contrastive losses corresponding to the plurality of corresponding pairs, and wherein the mutual information is based on the plurality of contrastive losses; and outputting the trained neural network for text-to-image generation.

In a fourth aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, training data comprising a plurality of textual descriptions, and one or more image renditions associated with each of the plurality of textual descriptions; training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the plurality of corresponding pairs comprise an image-to-image pair and a text-to-image pair, wherein the training of the neural network comprises determining a plurality of contrastive losses corresponding to the plurality of corresponding pairs, and wherein the mutual information is based on the plurality of contrastive losses; and outputting the trained neural network for text-to-image generation.

In a fifth aspect, a system is provided. The system includes means for receiving, by a computing device, training data comprising a plurality of textual descriptions, and one or more image renditions associated with each of the plurality of textual descriptions; means for training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the plurality of corresponding pairs comprise an image-to-image pair and a text-to-image pair, wherein the training of the neural network comprises determining a plurality of contrastive losses corresponding to the plurality of corresponding pairs, and wherein the mutual information is based on the plurality of contrastive losses and means for outputting the trained neural network for text-to-image generation.

In a sixth aspect, a computer-implemented method is provided. The method includes receiving, by a computing device, a particular textual description of a scene. The method also includes applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair. The method further includes predicting the output image rendition of the scene.

In a seventh aspect, a computing device is provided. The computing device includes one or more processors and data storage. The data storage has stored thereon computer-executable instructions that, when executed by one or more processors, cause the computing device to carry out functions. The functions include: receiving, by a computing device, a particular textual description of a scene; applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and predicting the output image rendition of the scene.

In an eighth aspect, a computer program is provided. The computer program includes instructions that, when executed by a computer, cause the computer to carry out functions. The functions include: receiving, by a computing device, a particular textual description of a scene; applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and predicting the output image rendition of the scene.

In a ninth aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, a particular textual description of a scene; applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and predicting the output image rendition of the scene.

In a tenth aspect, a system is provided. The system includes means for receiving, by a computing device, a particular textual description of a scene; means for applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and means for predicting the output image rendition of the scene.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4 is a table illustrating statistics of sample datasets utilized for a text-to-image synthesis model, in accordance with example embodiments.

FIG. 5 is a table illustrating example comparative results for various text-to-image synthesis models, in accordance with example embodiments.

FIG. 8 illustrates additional example images generated by a text-to-image synthesis model, in accordance with example embodiments.

FIG. 9 is a table illustrating example comparative results for various text-to-image synthesis models, in accordance with example embodiments.

FIG. 10 is a table illustrating example ablation results with different contrastive losses, in accordance with example embodiments.

FIG. 11 is a table illustrating example comparative results for different modulation layers, in accordance with example embodiments.

FIG. 12 is a table illustrating example comparative results for different VCG losses, in accordance with example embodiments.

FIGS. 13 and 14 are graphs illustrating example comparative results for different contrastive heads, in accordance with example embodiments.

FIG. 19 is a flowchart of a method, in accordance with example embodiments.

FIG. 20 is another flowchart of a method, in accordance with example embodiments.

DETAILED DESCRIPTION

Figure 1:
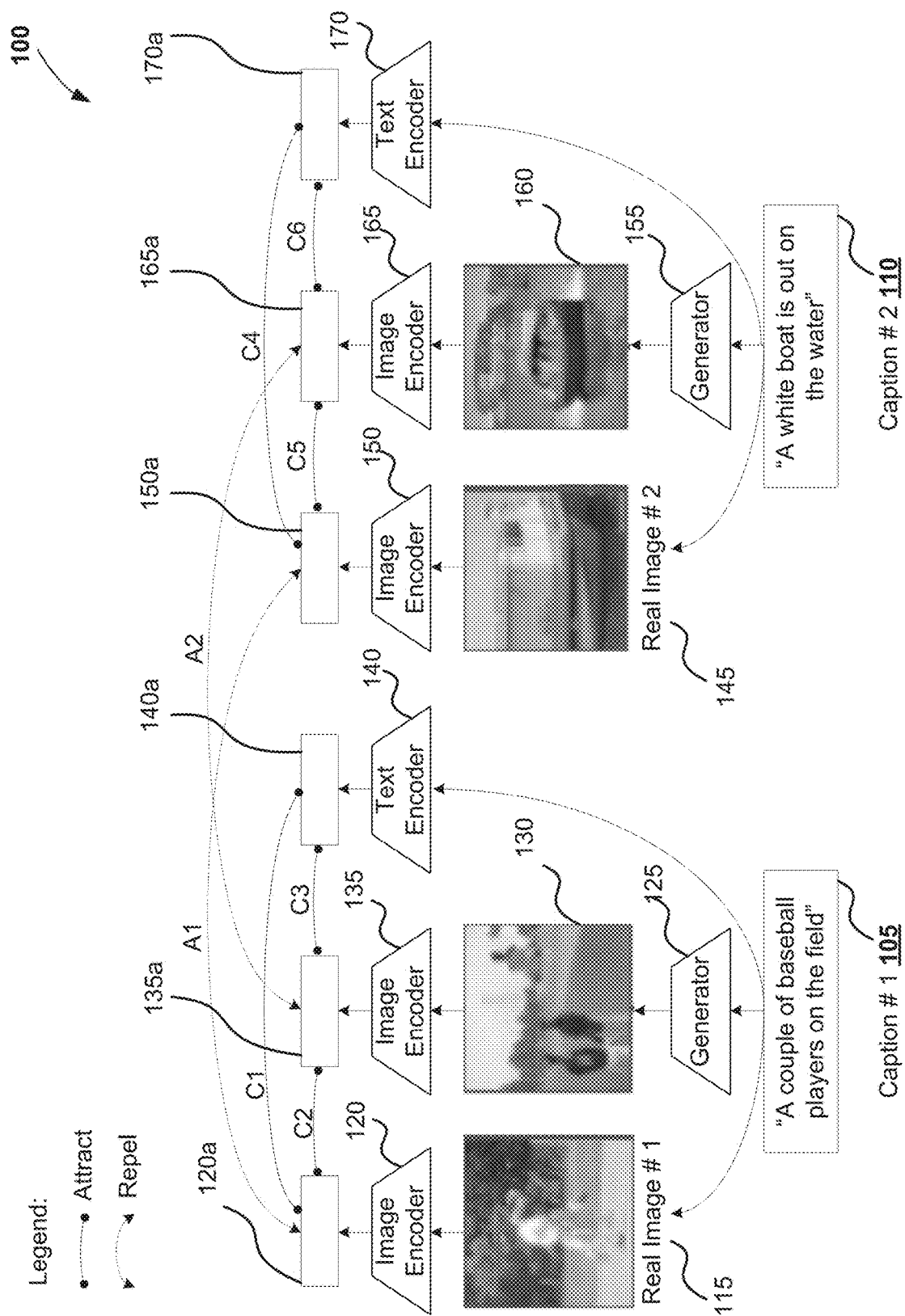
FIG. 1 is a diagram illustrating inter-modal and intra-modal contrastive losses for a text-to-image synthesis model, in accordance with example embodiments.

This application relates, in one aspect, to a machine learning based text-to-image synthesis system. A Cross-Modal Contrastive Generative Adversarial Network (XMC-GAN) is described that optimizes mutual information between an image and a corresponding text. In some embodiments, such optimization may be achieved via multiple contrastive losses that capture inter-modality and intra-modality correspondences. In some embodiments, XMC-GAN uses an attentional self-modulation generator that is configured to enable strong text-image correspondence, and a contrastive discriminator, that is configured to function as a critic, and as a feature encoder for contrastive learning. XMC-GAN provides better quality outputs over existing models by using intra-modality (image-image) and inter-modality (image-sentence and region-word) contrastive learning in text-to-image synthesis.

Contrastive learning in the context of text-to-image synthesis is described, and a simple one-stage GAN without object-level annotation is described. Such a one-stage model can generally outperform object-driven and multi-stage models. Besides generating realistic images, some criteria for high quality text-to-image generation may include properties such as (1) a holistic match between a generated image and a textual description; (2) a match between generated images and real images when the generated images are conditioned on the same description; and (3) individual image regions of a generated image should be recognizable and consistent with words in a sentence of the textual description. To fulfill these criteria and achieve strong language alignment, mutual information between the corresponding text and image pairs may be optimized through contrastive learning. As described herein, XMC-GAN uses image to sentence, image region to word, and image to image contrastive losses to enforce alignment between generated images and their captions.

A quality of XMC-GAN's output is a significant enhancement over existing models. For example, on the MS-COCO dataset, XMC-GAN improves state-of-the-art FID from 24.70 to 9.33. Also, for example, hwnan preference for an output of XMC-GAN is 77.3% for image quality and 74.1% for image-text alignment, compared to other existing models. XMC-GAN also generalizes to the Localized Narratives dataset (which has longer, more detailed descriptions), improving state-of-the-art FID from 48.70 to 14.12. In some embodiments, XMC-GAN is trained and evaluated on the Open Images dataset, establishing a strong benchmark FID score of 26.91.

XMC-GAN consistently produces images that are more coherent and detailed than existing models. In addition to greater realism (with clearer, more delineated objects), the outputs of XMC-GAN capture the full image description, including the presence of named objects and background compositions. Compared with a triplet loss, the contrastive loss described herein does not require mining for informative negatives, and thus lowers training complexity. Compared to multi-stage and multi-step frameworks, XMC-GAN has a single generator and discriminator trained end-to-end, and generates higher quality images.

Accordingly, a cross-modal contrastive learning fratnework to train GAN models for text-to-image synthesis is described. Several cross-modal contrastive losses are described that enforce correspondence between a generated image and a textual description. With both human and automated evaluations on multiple datasets, XMC-GAN establishes a marked improvement over existing models. For example, XMC-GAN generates higher quality images that better match their input descriptions, including for long, detailed narratives. The model described is a simpler, end-to-end model.

Contrastive Representation Learning

In some embodiments, a neural network for text-to-image generation is trained based on the training data. The neural network may be trained to cause two image renditions associated with a same textual description to attract each other and two image renditions associated with different textual descriptions to repel each other based on mutual information between a plurality of corresponding pairs. The plurality of corresponding pairs may include an image-to-image pair and a text-to-image pair. The terms "attract" and "repel" as used herein may be generally based on any quantitative measurement of similarity between pairs of images, between pairs of textual descriptions, or between an image and a textual description. Generally, "attract" refers to a distance getting smaller, and "repel" refers to a distance getting larger.

In some embodiments, the training of the neural network to cause two image renditions associated with a same textual description to attract each other and two image renditions associated with different textual descriptions to repel each other may involve determining similarity measures between pairs of image renditions. For example, a Euclidean distance between the images may be determined. Also, for example, a cosine similarity may be determined for the pair of images. Additional, and/or alternate similarity measures may be used to compute distances between images. Accordingly, the neural network can be trained to cause a first similarity measure for two image renditions associated with the same textual description to be less than a first threshold measure. Likewise, the neural network can be trained to cause a second similarity measure for two image renditions associated with different textual descriptions to be greater than a second threshold measure. For example, two image renditions may be determined to be attracting each other if the distance between the two image renditions is within a first threshold, where the distance is based on the similarity measure, and two image renditions may be determined to be repelling each other if the distance between the two image renditions is more than a second threshold.

For example, a text-to-image pair may include a textual description and an image corresponding to the textual description, or a textual description and an image not corresponding to the textual description (e.g., corresponding to a different textual description). Accordingly, a text-to-image pair comprising a textual description and an image corresponding to the textual description would attract each other (e.g., are close together based on a measure of similarity or are within a first threshold of a similarity measure), whereas a text-to-image pair comprising a textual description and an image not corresponding to the textual description would repel each other (e.g., are far apart based on a measure of similarity, or are greater than a second threshold of a similarity measure). A text-to-image pair may also include a portion of the textual description and an image, a portion of the textual description and a portion of an image, or the textual description and a portion of an image.

Also, for example, an image-to-image pair may include a pair of images corresponding to a same textual description, or a pair of images corresponding to different textual descriptions. Accordingly, the image-to-image pair corresponding to the same textual description would attract each other (e.g., are close together based on a measure of similarity), whereas the image-to-image pair corresponding to different textual descriptions would repel each other (e.g., are far apart based on a measure of similarity). An image could be a real image or a generated image, and so an image-to-image pair may include pairs of real images, pairs of generated images, and/or pairs comprising a real and generated image. Also, for example, the image could refer to a portion of an image, real or generated. Accordingly, an image-to-image pair may include a pair of images, a pair of portions of images, and/or a pair of a portion of an image and an image.

FIG. 1 is a diagram illustrating inter-modal and intra-modal contrastive losses for a text-to-image synthesis model 100, in accordance with example embodiments. First caption 105 may read "a couple of baseball players on the field." First real image 115 may correspond to first caption 105. First generator 125 of text-to-image synthesis model 100 may generate first generated image 130 based on first caption 105. First image encoder 120 may encode first real image 115 to generate a first encoded image representation 120a. Second image encoder 135 may encode first generated image 130 to generate a second encoded image representation 135a. First text encoder 140 may encode first caption 105 to generate a first encoded text representation 140a. As indicated by connectors C1, C2, and C3, text-to-image synthesis model 100 is trained so that first encoded image representation 120a, second encoded image representation 135a, and first encoded text representation 140a, are mutually attractive, as they are based on first caption 105.

Second caption 110 may read, "A white boat is out on the water." Second real image 145 may correspond to second caption 110. Second generator 155 of text-to-image synthesis model 100 may generate second generated image 160 based on second caption 110. Third image encoder 150 may encode second real image 145 to generate a third encoded image representation 150a. Fourth image encoder 165 may encode second generated image 160 to generate a fourth encoded image representation 165a. Second text encoder 170 may encode second caption 110 to generate a second encoded text representation 170a. As indicated by connectors C4, C5, and C6, text-to-image synthesis model 100 is trained so that third encoded image representation 150a, fourth encoded image representation 165a, and second encoded text representation 170a, are mutually attractive, as they are based on second caption 110.

Consistent with contrastive learning objectives, text-to-image synthesis model 100 can be trained so that two image renditions associated with different textual descriptions repel each other. For example, as indicated with bidirectional dashed arrow A1, text-to-image synthesis model 100 is trained so that first encoded image representation 120a corresponding to first caption 105, and third encoded image representation 150a corresponding to second caption 110, repel each other as first caption 105 and second caption 110 are different textual descriptions. As another example, as indicated with bidirectional dashed arrow A2, text-to-image synthesis model 100 is trained so that second encoded image representation 135a corresponding to first caption 105, and fourth encoded image representation 165a corresponding to second caption 110, repel each other as first caption 105 and second caption 110 are different textual descriptions.

Given two random variables $v_1$ and $v_2$, often known as views of the data, contrastive learning aims to find useful representations of $v_1$ and $v_2$ by learning a function that measures the dependence of two views, i.e., whether samples are from a joint distribution $p(v_1)p(v_2|v_1)$, or from a product of the marginals, $p(v_1)p(v_2)$. The resulting function is an estimator of a mutual information $I(v_1; v_2)$. Generally, direct optimization of the mutual information may not be easy. Accordingly, an Information Noise-Contrastive Estimation (InfoNCE) loss may be used to maximize a lower bound of the mutual information $I(v_1; v_2)$. InfoNCE is a type of contrastive loss function that is used in self-supervised learning models.

In particular, for a query sample $v_{1,i}$, the InfoNCE loss, $\mathcal{L}_{NCE}$, may be minimized to score a matching positive sample $v_{2,i} \sim p(v_2|v_{1,i})$ higher than $M-1$ negative samples $v_{2,j} \sim p(v_2)$. The overall objective may be summarized as follows:

$$I(v_1; v_2) \geq \log(M) - \mathcal{L}_{NCE} \quad \text{(Eqn. 1)}$$

where $$\mathcal{L}_{NCE} = -\mathbb{E}\left[\log \frac{\exp(\mathcal{S}(v_{1,i}; v_{2,i}))}{\sum_{j=1}^{M} \exp(\mathcal{S}(v_{1,i}; v_{2,j}))}\right] \quad \text{(Eqn. 2)}$$

Here, $\mathcal{S}(.,.)$ is a score function, which may include two parameterized feature encoders for $v_1$ and $v_2$. The encoders can share parameters if $v_1$ and $v_2$ are from the same domain. There may be several ways to construct $v_1$ and $v_2$, such as, for example, different augmentations of the same image, spatially adjacent image patches, a video as $v_1$ and ifs aligned audio as $v_2$ for video representation learning, and so forth.

Generative Adversarial Networks (GANs)

GANs are generative models that employ a generator G and a discriminator D. In some embodiments, training data may be received via a computing device. Training data may include a plurality of textual descriptions, and one or more image renditions associated with each of the plurality of textual descriptions. The generator G maps a latent variable $z \sim p(z)$ (usually sampled from a Gaussian distribution) to a real data distribution $p_{data}$. The discriminator D is trained to distinguish whether inputs are synthesized by G or sampled from real data. The generator G is trained to synthesize images that the discriminator D will classify as real.

In some embodiments, a plurality of contrastive losses corresponding to the plurality of corresponding pairs may be determined, and the mutual information may be based on the plurality of contrastive losses. The plurality of corresponding pairs comprises an image-to-image pair and a text-to-image pair. In some embodiments, the text-to-image pair may include an image and an associated textual description. In some embodiments, the text-to-image pair may include portions of an image and corresponding portions of an associated textual description. An adversarial objective may be configured to improve training. For example, a hinge loss, $\mathcal{L}_D$ may be determined as:

$$\mathcal{L}_D = -\mathbb{E}_{x \sim p_{data}}[\min(0,-1+D(x))] - \mathbb{E}_{z \sim p(z)}[\min(0,-1+D(G(z)))] \quad \text{(Eqn. 3)}$$

$$\mathcal{L}_D = -\mathbb{E}_{z \sim p(z)}[D(G(z))] \quad \text{(Eqn. 4)}$$

The hinge loss $\mathcal{L}_D$ may be used in GANs for image generation. For conditional GANs, the generator G and a discriminator D are provided with an additional condition c, yielding $G(z, c)$ and $D(x, c)$. For conditional generation, it may be desirable for a generated sample to be realistic, and match the condition c.

Contrastive Losses for Text-to-Image Synthesis

Text-to-image synthesis can be configured as a conditional generation task. It is desirable that generated images be realistic and well aligned with a given textual description. In some embodiments, the mutual information may be based on a contrastive loss between: (a) an image and an associated textual description, (b) a known image and a predicted image for a same associated textual description, and (c) portions of an image and corresponding portions of an associated textual description. To achieve this, the mutual information between the corresponding pairs may be optimized, where the pairs include: (1) an image and a sentence, (2) a generated image and a real image, both corresponding to the same textual description, and (3) image regions and words. Directly maximizing mutual information may be challenging; however, a lower bound of the mutual information may be maximized by optimizing contrastive (i.e., InfoNCE) losses.

Image-Text Contrastive Loss

In some embodiments, the plurality of contrastive losses may be based on normalized temperature-scaled cross-entropy losses. Given an image x and its corresponding description s, a score function, $\mathcal{S}_{sent}$, may be determined as:

$$\mathcal{S}_{sent}(x, s) = \cos\frac{f_{img}(x), f_{sent}(s)}{\tau}, \quad \text{(Eqn. 5)}$$

where $\cos(u, v) = u^T v / \|u\|\|v\|$ denotes cosine similarity, and $\tau$ denotes a temperature hyper-parameter. $f_{img}$ is an image encoder to extract the overall image feature vector and $f_{sent}$ is a sentence encoder to extract the global sentence feature vector. This maps the image and sentence representations into a joint embedding space $\mathbb{R}^D$. The contrastive loss, $\mathcal{L}_{sent}$, between image $x_i$ and its paired sentence $s_i$ may be determined as:

$$\mathcal{L}_{sent}(x_i, s_i) = -\log \frac{\exp\left(\cos\frac{f_{img}(x_i), f_{sent}(s_i)}{\tau}\right)}{\sum_{j=1}^{M} \exp\left(\cos\frac{f_{img}(x_i), f_{sent}(s_j)}{\tau}\right)} \quad \text{(Eqn. 6)}$$

Such a contrastive loss is also known as a normalized temperature-scaled cross entropy loss (NT-Xent).

Contrastive Loss Between Generated and Real Images with a Shared Description

Such a contrastive loss may be defined with NT-Xent. The main difference is that a shared image encoder $f'_{img}$ extracts features for both real and generated images. The score function, $\mathcal{S}_{img}$, between two images may be determined as:

$$\mathcal{S}_{img}(x, \tilde{x}) = \cos\frac{f'_{img}(x), f'_{img}(\tilde{x})}{\tau}, \quad \text{(Eqn. 7)}$$

The image-image contrastive loss, $\mathcal{L}_{img}$, between real image $x_i$ and generated image $G(z_i, s_i)$ may be determined as:

$$\mathcal{L}_{img}(x_i, G(z_i, s_i)) = -\log \frac{\exp(\mathcal{S}_{img}(x_i, G(z_i, s_i)))}{\sum_{j=1}^{M} \exp(\mathcal{S}_{img}(x_i, G(z_j, s_j)))} \quad \text{(Eqn. 8)}$$

Contrastive Loss Between Image Regions and Words

For an accurate test-to-image synthesis model, it is desirable that individual image regions be consistent with corresponding words in an input textual description. To achieve this objective, attention may be used to learn connections between regions in image x and words in sentence s, without requiring fine-grained annotations that align words and regions. In some embodiments, a soft-attention between a particular portion of an image and a particular portion of a textual description may be determined. For example, a pairwise cosine similarity matrix between all words in the sentence and all regions in the image may be computed, and a soft attention $\alpha_{i,j}$ for word $w_i$ to region $r_j$ may be determined as:

$$\alpha_{i,j} = \frac{\exp(\rho_1 \cos(f_{word}(w_i), f_{region}(r_j)))}{\sum_{h=1}^{R} \exp(\rho_1 \cos(f_{word}(w_i), f_{region}(r_h)))} \quad \text{(Eqn. 9)}$$

where $f_{word}$ and $f_{region}$ represent word and region feature encoders respectively, R is the total number of regions in the image and $\rho_1$ is a sharpening hyper-parameter to reduce the entropy of the soft attention. The aligned region feature for the $i^{th}$ word may be defined as $c_i = \Sigma_{j=1}^{R} \alpha_{i,j} f_{region}(r_j)$. A score function, $s_{word}$, between all the regions in image x and all words in sentence s can then be determined as:

$$S_{word}(x, s) = \frac{\log\left(\sum_{h=1}^{T} \exp(\rho_2 \cos(f_{word}(w_h), c_h))\right)^{\frac{1}{\rho_2}}}{\tau} \quad \text{(Eqn. 10)}$$

where T is a total number of words in the sentence, $\rho_2$ is a hyper-parameter that determines a weight of the most aligned word-region pair, as $\rho_2 \to \infty$, the score function, $s_{word}$, approximates to $\max_{h=1}^{T} \cos(f_{word}(w_h), c_h)$. Based on the score function, $s_{word}$, a contrastive loss, $\mathcal{L}_{word}$, between the words and regions in image $x_i$ and its aligned sentence $s_i$ may be determined as:

$$\mathcal{L}_{word}(x_i, s_i) = -\log \frac{\exp(S_{word}(x_i, s_i))}{\sum_{j=1}^{M} \exp(S_{word}(x_i, s_i))}. \quad \text{(Eqn. 11)}$$

Attentional Self-Modulation Generator

In some embodiments, the neural network may be a generative adversarial network including a generator. The image-to-image pair may include an image rendition of the one or more image renditions, and an image generated by the generator. In some embodiments, a one-stage generator may be configured to directly generate an image at a desired resolution. This is a simpler model than existing multi-stage generators that create images at multiple, different resolutions.

Figure 2:
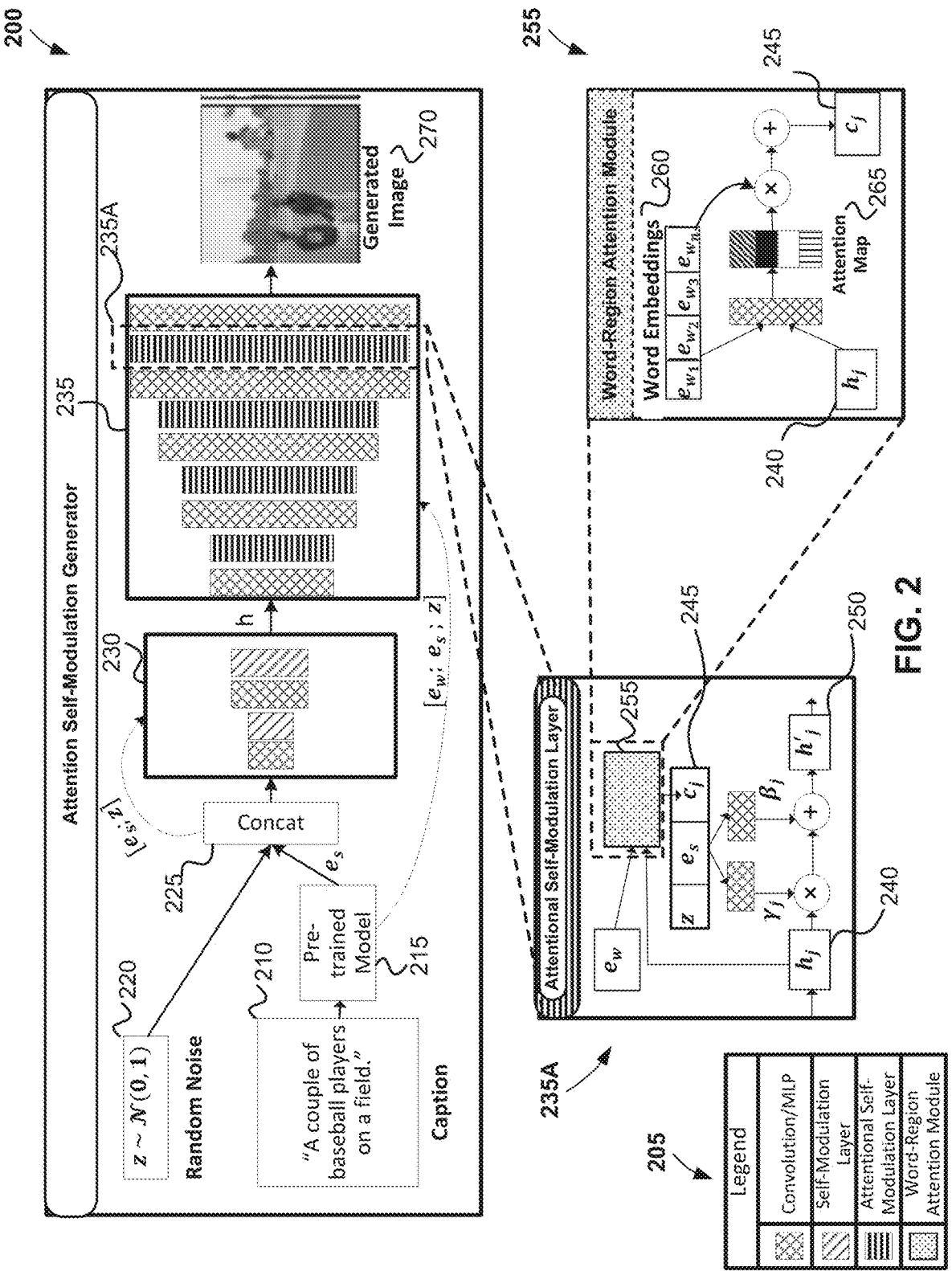
FIG. 2 is a diagram illustrating an example generator for a text-to-image synthesis model, in accordance with example embodiments.

FIG. 2 is a diagram illustrating an example generator 200 for a text-to-image synthesis model, in accordance with example embodiments. Random noise 220, denoted by z, may be sampled from a standard Gaussian distribution. A caption 210 may read "a couple of baseball players on a field." A global sentence embedding $e_s$ and word embeddings $e_w$ may be generated. In some embodiments, global sentence embedding $e_s$ and word embeddings $e_w$ may be obtained from a pre-trained model 215 (e.g., from a pre-trained Bidirectional Encoder Representations from Transformers (BERT) module). A concatenation module, concat 225, may concatenate the global sentence embedding $e_s$ and the random noise 220, z, to form a global condition $[e_s; z]$. The global condition $[e_s; z]$ may be passed through one or more up-sampling blocks 230 to generate a 16×16 feature map. In some embodiments, the global condition $[e_s; z]$ may also be used as a condition to calculate scale parameter $\gamma$ and shift parameter $\beta$ in conditional batch normalization layers. Such a formulation is also known as self-modulation. As indicated by legend 205, the one or more up-sampling blocks 230 may include one or more convolutional (or multi-layer perceptron (MLP)) neural networks, and one or more self-modulation layers.

Although a self-modulation layer may improve consistency of a hidden feature with the conditional inputs, it may not capture finer details for each sub-region. To generate fine-grained, recognizable regions, one or more attentional self-modulation layers may be added. As indicated, a second global condition $[e_w; e_s; z]$, that incorporates word embeddings $e_w$, may be passed through one or more up-sampling blocks 235. As indicated by legend 205, the one or more up-sampling blocks 235 may include one or more convolutional/MLP neural networks, and one or more attentional self-modulation layers, such as, for example, attentional self-modulation layer 235A.

For example, in addition to random noise 220, z, and global sentence embedding, $e_s$, the attention mechanism may be modified to determine a word-context vector as an additional modulation parameter for each sub-region. An enlarged view of attentional self-modulation layer 235A is illustrated for a particular sub-region of an image. For example, for a $j^{th}$ region with feature 240, $h_j$, a word-context vector 245, $c_j$, may be determined by word-region attention module 255 as $c_j = \Sigma_{i=1}^{T} \tilde{\alpha}_{j,i} e_{w_i}$, where $$\tilde{\alpha}_{j,i} = \frac{\exp(\rho_0 \cos(e_{wi}, h_j))}{\sum_{k=1}^{T} \exp(\rho_0 \cos(e_{wk}, h_j))} \quad \text{(Eqn. 12)}$$

where T is a total number of words in the sentence and $\rho_0$ is a sharpening hyper-parameter. Then, a modulated feature 250, $h'_j$, for the $j^{th}$ region may be determined as:

$$h'_j = \gamma_j(\text{concat}(z, e_s, c_j)) \odot \frac{h_j - \mu}{\sigma} + \beta_j(\text{concat}(z, e_s, c_j)) \quad \text{(Eqn. 13)}$$

where $\mu$ and $\sigma$ are the estimated mean and standard deviation from aggregating both batch and spatial dimensions. Also, for example, $\gamma_j(.)$ and $\beta_j(.)$ represent function approximators, which may be, for example, linear projection layers. An enlarged view of word-region attention module 255 is illustrated. As indicated, word embeddings 260, $e_{w_1}$, $e_{w_2}$, ..., $e_{w_n}$, and feature 240, $h_j$, may be input to a convolutional/MLP neural network. An attention map 265 may be applied to output word-context vector 245, $c_j$. Such an attentional self-modulation process may be applied to each sub-region of an image. The one or more up-sampling blocks 235 of generator 200 may then output generated image 270.

In some embodiments, the training of the neural network may include generating one or more object level pseudo-labels for an image based on the text-to-image pair. Such pseudo-labels generally eliminate a need for fine-grained object labels (e.g., object bounding boxes or segmentation maps), which would otherwise make generation a multi-step process.

Contrastive Discriminator

In some embodiments, the neural network may be a generative adversarial network comprising a discriminator trained to generate, for an image, one or more of: a global feature representation or a local feature representation. Generally, a discriminator described herein may serve a dual purpose: (1) act as a critic to determine whether an input image is real or generated, and (2) act as an encoder to compute global image and region features for contrastive losses.

Figure 3:
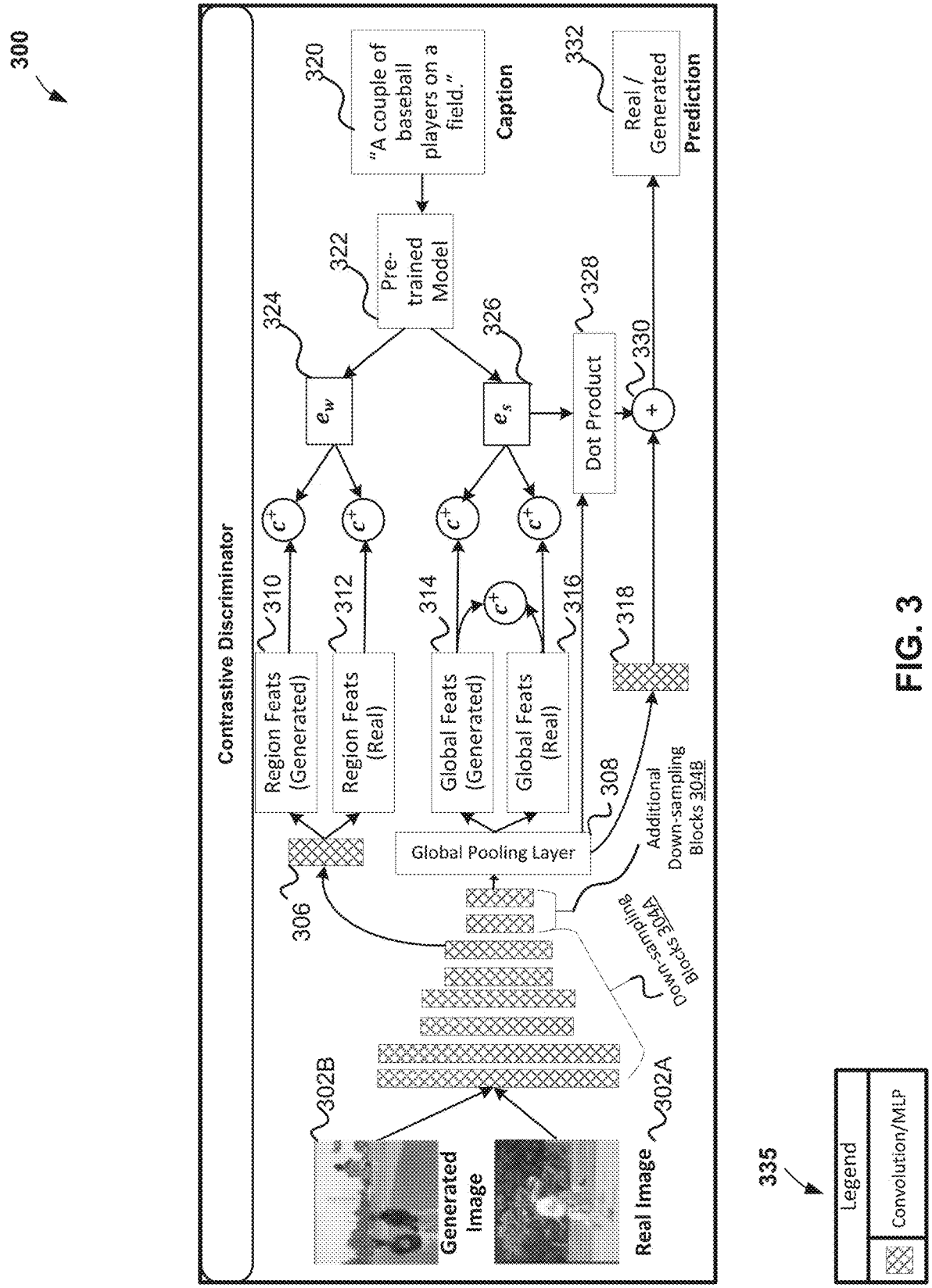
FIG. 3 is a diagram illustrating an example discriminator for a text-to-image synthesis model, in accordance with example embodiments.

FIG. 3 is a diagram illustrating an example discriminator 300 for a text-to-image synthesis model, in accordance with example embodiments. Real image 302A (e.g., first real image 115 of FIG. 1) and generated image 302B (e.g., first generated image 130 of FIG. 1, such as, for example, generated image 270 of FIG. 2 generated by generator 200) may correspond to a same textual description (e.g., caption 210 of FIG. 2, or caption 320). Image encodings for real image 302A and generated image 302B may be passed through one or more down-sampling blocks 304A until the spatial dimension for the image encodings is reduced to 16×16. As indicated by legend 335, the one or more down-sampling blocks 304A may include one or more convolutional/MLP neural networks.

In some embodiments, discriminator 300 may generate the local feature representation for the image, and a dimension of the local feature representation is configured to match a dimension for a local feature representation of an associated textual description. For example, a 1×1 convolution may be applied by convolution block 306 to the 16×16 image encoding output of the one or more down-sampling blocks 304A to obtain one or more region features for real image 302A and generated image 302B. For example, a first region feature 310 may correspond to generated image 302B, and a second region feature 312 may correspond to real image 302A. Generally, region features may be generated for a plurality of sub-regions of each image.

Also, for example, text embeddings may be determined from a textual description. For example, as described with reference to FIG. 2, based on the textual description (e.g., caption 210 of FIG. 2, or caption 320), one or more word embeddings 324, $e_w$, and a global sentence embedding 326, $e_s$, may be generated. In some embodiments, a dimension of the one or more region features (e.g., first region feature 310 and second region feature 312) may correspond to a dimension of the one or more word embeddings 324, $e_w$. In some embodiments, one or more word embeddings 324, $e_w$, and a global sentence embedding 326, $e_s$, may be generated by a pre-trained model 322 (e.g., a BERT module). Pre-trained model 322 may share one or more aspects with pre-trained model 215 of FIG. 2. In this aspect, discriminator 300 may serve a role of an encoder to compute global image and region features for contrastive losses.

In some embodiments, the 16×16 image encoding output of the one or more down-sampling blocks 304A may be fed through two more down-sampling blocks, such as, for example, additional down-sampling blocks 304B. As indicated by legend 335, additional down-sampling blocks 304B may include one or more convolutional/MLP neural networks. An output of additional down-sampling blocks 304B may be fed into a global pooling layer 308. Global pooling layer 308 may generate global feature representations for real image 302A and generated image 302B. For example, a first global feature 314 may correspond to generated image 302B, and a second global feature 316 may correspond to real image 302A. Generally, each image corresponds to a global feature representation.

In some embodiments, a projection head may compute a logit for an adversarial loss, and a separate projection head may compute image features for an image-sentence and image-image contrastive losses. As previously described, one or more contrastive losses may be determined, such as, for example, contrastive losses between pairs of: (1) an image and a sentence, (2) a generated image and a real image, both corresponding to the same textual description, and (3) image regions and words. For example, $c^+$ denotes attractive contrastive losses. Also, for example, dot product module 328 and addition module 330 may perform functions as described with respect to Eqns. 12 and 13.

Generally, real images and their corresponding descriptions are utilized to train the projection heads for discriminator 300. This is because generated images may not be recognizable, especially at the start of a training process. Accordingly, using such generated image and sentence pairs may diminish a quality of the training of the image feature encoder projection heads. Therefore, the contrastive losses from generated images are not used in discriminator 300, but may be applied to generator 200. In some embodiments, in addition to the projection layers for discriminator 300, a pre-trained, deep convolutional network (CNN) based object-recognition model 318 (e.g., a VGG network) may be used as an image encoder for an additional supervisory image-image contrastive loss. Based on the contrastive losses, discriminator 300 may predict, at block 332, whether an input image is a real image or an image generated by a generator (e.g., generator 200). As previously indicated, discriminator 300 may be trained to distinguish whether image inputs are synthesized by generator 200 or sampled from real data. Generator 200 may be trained to synthesize images that discriminator 300 will classify as a real image.

Example Training Algorithm

An example training algorithm provided below summarizes the XMC-GAN training procedure. For simplicity, all contrastive loss coefficients ($\lambda_1$, $\lambda_2$, $\lambda_3$ in the algorithm) may be initialized to 1.0.

Input: generator and discriminator parameters $\theta_G$, $\theta_D$, contrastive loss coefficients $\lambda_1$, $\lambda_2$, $\lambda_3$, Adam hyperparameters $\beta_1$, $\beta_2$, generator and discriminator learning rates $l_{r_G}$, $l_{r_D}$, respectively, batch size M, a number of discriminator iterations per generator iteration $N_D$.

Step 1: for number of training iterations do
Step 2:    for t = 1, ... , $N_D$ do
Step 3:      Sample $\{z_i\}_{i=1}^{M} \sim p(z)$
Step 4:      Sample $\{(x_i, s_i)\}_{i=1}^{M} \sim p_{data}(x, s)$
Step 5:      $\mathcal{L}_{sent}^{r} \leftarrow \frac{1}{M}\sum_{i=1}^{M}\mathcal{L}_{sent}(x_i, s_i)$
Step 6:      $\mathcal{L}_{word}^{r} \leftarrow \frac{1}{M}\sum_{i=1}^{M}\mathcal{L}_{word}(x_i, s_i)$
Step 7:      $\mathcal{L}_{GAN}^{D} \leftarrow -\frac{1}{M}\sum_{i=1}^{M}\min(0, -1 + D(x_i, s_i)) - \frac{1}{M}\sum_{i=1}^{M}\min(0, -1 - D(G(z_i, s_i), s_i))$
Step 8:      $\mathcal{L}_D \leftarrow \mathcal{L}_{GAN}^{D} + \lambda_1 \mathcal{L}_{sent}^{r} + \lambda_2 \mathcal{L}_{word}^{r}$
Step 9:      $\theta_D \leftarrow$ Adam($\mathcal{L}_D$, $l_{r_D}$, $\beta_1$, $\beta_2$)
Step 10:    end for -continued

| Step 11: | Sample $\{z_i\}_{i=1}^{M} \sim p(z)$, $\{(x_i, s_i)\}_{i=1}^{M} \sim p_{data}(x, s)$ |
| --- | --- |
| Step 12: | $\mathcal{L}_{sent}^{f} \leftarrow \frac{1}{M}\sum_{i=1}^{M}\mathcal{L}_{sent}(G(z_i, s_i), s_i)$ |
| Step 13: | $\mathcal{L}_{word}^{f} \leftarrow \frac{1}{M}\sum_{i=1}^{M}\mathcal{L}_{word}(G(z_i, s_i), s_i)$ |
| Step 14: | $\mathcal{L}_{img} \leftarrow \frac{1}{M}\sum_{i=1}^{M}\mathcal{L}_{img}(G(z_i, s_i), x_i)$ |
| Step 15: | $\mathcal{L}_{Gan}^{G} \leftarrow \frac{1}{M}\sum_{i=1}^{M} -(D(G(z_i, s_i), s_i))$ |
| Step 16: | $\mathcal{L}_G \leftarrow \mathcal{L}_{GAN}^{G} + \lambda_1 \mathcal{L}_{sent}^{f} + \lambda_2 \mathcal{L}_{word}^{f} + \lambda_3 \mathcal{L}_{img}$ |
| Step 17: | $\theta_G \leftarrow$ Adam $(\mathcal{L}_G, 1_{r_G}, \beta_1, \beta_2)$ |
| Step 18: | end for |

Example Inference Processes

As described herein, text-to-image synthesis may be performed with a trained neural network. In some embodiments, a particular textual description of a scene of a scene may be received. For example, the particular textual description may be received via a text input interface of a computing device. In some embodiments, an image description may be received in in audio format, and the particular textual description may be a transcribed version of the audio format. As another example, the particular textual description may be received as an audio input via an audio input component (e.g, a microphone) of the computing device. In some embodiments, the audio input may be transcribed to generate a particular textual description. In some embodiments, the neural network may receive the audio input without a transcribed textual version.

In some embodiments, a global feature embedding for the particular textual description, and a local feature embedding for a portion of the particular textual description may be obtained from a deep bidirectional transformer. For example, the particular textual description may be preprocessed by another neural network to generate feature embeddings.

In some embodiments, a neural network for text-to-image generation may be applied to generate an output image rendition of the scene. As described herein, the neural network may be trained to cause two image renditions associated with a same textual description to attract each other and two image renditions associated with different textual descriptions to repel each other based on mutual information between a plurality of corresponding pairs. The plurality of corresponding pairs comprise an image-to-image pair and a text-to-image pair. The neural network may be a generative adversarial network comprising a one-stage generator, such as generator 200 of FIG. 2.

In some embodiments, the generator may include an attentional self-modulation layer that generates a context representation for a portion of the particular textual description. For example, the context representation may be generated for a portion of a sentence. In some embodiments, the particular textual description may be a paragraph, and the context representation may be generated for a portion of the paragraph, such as, for example, one or more phrases, one or more sentences, and so forth. Generally, the context representation is indicative of a contextual relationship of the portion to the particular textual description.

In some embodiments, the scene may describe virtual reality or augmented reality, and the predicting of the output image rendition may include generating an image rendition of the scene as described, in a format suitable for virtual reality or augmented reality. For example, a scene for virtual reality or augmented reality may be described, and the trained neural network may generate a rendition of the scene. Also, for example, the scene may be described in a play or a screenplay, and the trained neural network may generate a rendition of the scene. For example, one or more scene settings in a scene or an act in a dramatic play may be divided into smaller portions, and the trained neural network may generate a rendition of the one or more scene settings. As another example, the scene may describe a gaming environment, and the trained neural network may generate a rendition of the scene.

In some embodiments, an image style for the image description may be received, and the predicting of the output image rendition may include generating the output image rendition to conform to the image style. For example, the particular textual description may describe a style of art (e.g., impressionist, cubist, gothic, modern, and so forth), a style of photo (e.g., black and white, colored, low resolution, high resolution, close-up, portrait, panoramic, and so forth), and the trained neural network may generate a rendition of the scene in the desired style.

In some embodiments, the particular textual description may describe a plurality of scenes, and a plurality of video frames of video content corresponding to the respective plurality of scenes may be generated by the trained neural network.

Evaluation

Three test datasets may be used for evaluation purposes: MICROSOFT® Common Objects in Context (MS-COCO), Localized Narratives Common Objects in Context (LN-COCO), and Localized Narratives in the Open Images dataset (LN-OpenImages).

FIG. 4 is a table 400 illustrating statistics of sample datasets utilized for a text-to-image synthesis model, in accordance with example embodiments. Table 400 includes three columns corresponding to three test datasets MS-COCO, LN-COCO, and LN-OpenImages. First row 4R1 displays the dataset, second row 4R2 displays a number of samples for each dataset, third row 4R3 displays a number of captions, and fourth row 4R4 displays an average caption length.

MS-COCO

MS-COCO is commonly used for text-to-image synthesis. First column 4C1 displays results for the 2014 split of Common Objects in Context (COCO-14). As indicated in second row 4R2, this dataset corresponds to 82 k training data and 40 k validation data. As indicated in third row 4R3, each image is paired with five short captions, and as indicated in fourth row 4R4, an average caption length is 10.5. Example captions and images from COCO-14 are displayed in FIG. 7.

LN-COCO

Localized Narratives (LN) contains long form image descriptions for several image collections. Results may be benchmarked on LN-COLO, which contains narratives for images in the 2017 split of MS-COCO (COCO-17). Second column 4C2 displays results for LN-COCO. As indicated in second row 4R2, this dataset corresponds to 134 k training data and 8 k validation data. As indicated in third row 4R3, each image is paired with one caption, and as indicated in fourth row 4R4, an average caption length is 42.1. Thus, narratives in LN-COCO are four times longer than in MS-COCO captions on average, and the narratives are much more descriptive. Example captions and images from LN-COCO are displayed in FIG. 8. Narratives may also contain disfluencies since the narratives are spoken and then transcribed. These factors may make text-to-image synthesis for images in the LN-COCO dataset much more challenging than for images in the MS-COCO dataset.

LN-OpenImages

Training and evaluation may also be performed using LN-OpenImages, the Open Images split of Localized Narratives. Third column 4C3 displays results for LN-OpenImages. As indicated in second row 4R2, this dataset corresponds to 507 k training data and 41 k validation data. As indicated in third row 4R3, each image is paired with one caption, and as indicated in fourth row 4R4, an average caption length is 35.6. Images in LN-OpenImages are both diverse and complex (e.g., 8.4 objects on average). LN-OpenImages is also much larger than MS-COCO and LN-COCO.

Evaluation Metrics

Validation results may be determined by generating images for 30,000 random captions. Several evaluation metrics may be utilized for a comprehensive evaluation and comparison to existing text-to-image generation models.

Image Quality

One or more standard automated metrics may be utilized for assessing image quality. For example, an Inception Score (IS) calculates a Kullback-Leibler divergence (KL-divergence) between the conditional class distribution and the marginal class distribution given a pre-trained image classifier. Also, for example, Frechet Inception Distance (FID) is the Fréchet distance between two multivariate Gaussians fit to inception features of generated and real images. While IS and FID have both been shown to correlate with human judgements of generated image quality, IS is likely less informative as it overfits easily and may be manipulated to achieve much higher scores. This is further emphasized by results herein that illustrate that HD correlates better with human judgments of realism.

Text-Image Alignment

Another evaluation metric, R-precision, may be used to assess whether a generated image can be used to retrieve its conditioning description. Generally, R-precision may be computed using image-text encoders from AttnGAN, and these encoders may be used in existing models as part of an optimization function during training. Such an application however may skew the evaluation results. For example, several generated models report R-precision scores significantly higher than real images. To alleviate this, in training XMC-GAN, an image-text dual-encoder may be pre-trained on real images in the Conceptual Captions dataset, which is a dataset that is disjoint from MS-COCO. Generally, computing R-precision with such independent encoders better correlates with human judgments.

Caption retrieval metrics assess whether the entire image matches the caption. In contrast, Semantic Object Accuracy (SOA) evaluates the quality of individual regions and objects within an image. As illustrated herein. SOA-C (i.e., the percentage of images per class in which a desired object is detected) and SOA-I (i.e., the percentage of images in which a desired object is detected) results are provided. SOA is generally designed for COCO-14, and may take very long to compute as it requires generating multiple samples for each MS-COCO class label.

FIG. 5 is a table 500 illustrating example comparative results for various text-to-image synthesis models, in accordance with example embodiments. Table 500 includes six columns. First column 5C1 indicates a model name, second column 5C2 displays results for IS, third column 5C3 displays results for FID, fourth column 5C4 displays results for R-prec, fifth column 5C5 displays results for SOA-C, and sixth column 5C6 displays results for SOA-I. First row 5R1 displays results for real images, second row 5R2 displays results for AttnGAN, third row 5R3 displays results for Object-driven attentive GAN (Obj-GAN), fourth row 5R4 displays results for DM-GAN, fifth row 5R5 displays results for object preserving GAN (OP-GAN), sixth row 5R6 displays results for SD-GAN, seventh row 5R7 displays results for CP-GAN, and eighth row 5R8 displays results for the model described herein, XMC-GAN. As indicated in second column 5C2, the IS for XMC-GAN (in eighth row 5R8) is 30.45 which is comparable to the IS for real images (in first row 5R1) displayed as 34.88. Likewise, as indicated in third column 5C3, the FID for XMC-GAN (in eighth row 5R8) is 9.33 which is comparable to the FID for real images (in first row 5R1) displayed as 6.09. Also, for example, the FID for XMC-GAN is the lowest among all models evaluated, indicating a high quality of generated images. Additional evaluation results are displayed that indicate some high quality image generation attributes of XMC-GAN.

Human Evaluation

Although automated metrics are generally useful while iterating on models during experimentation, the results may not be as accurate as for human evaluation. Accordingly, human evaluations may be performed on generated images from one thousand (1000) randomly selected captions. For each caption, five independent human annotators may be asked to rank the generated images from best to worst based on (1) realism, and (2) language alignment.

Experiments—Results

Results on the three datasets are set forth below:

COCO-14

Figure 6:
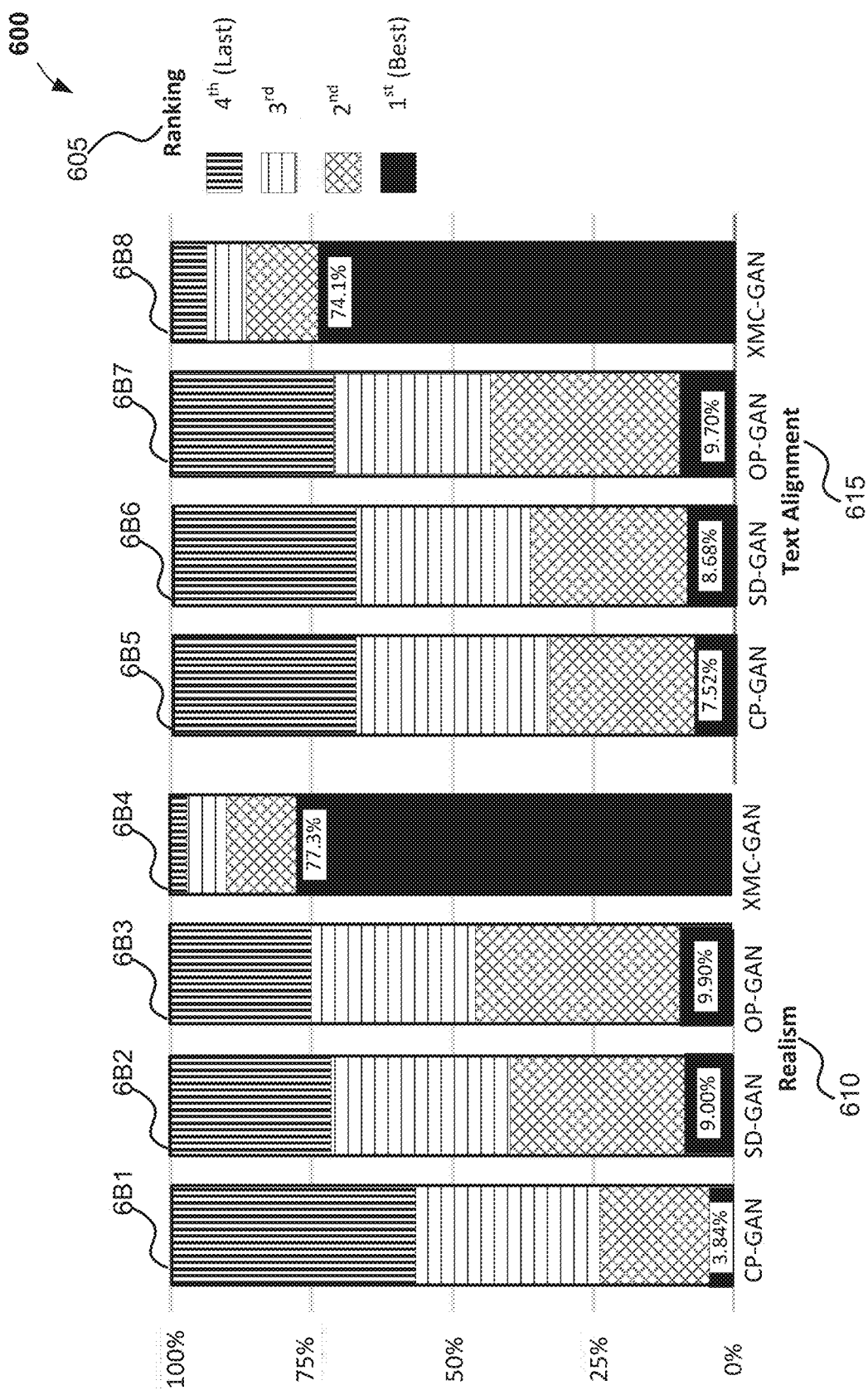
FIG. 6 is a bar diagram illustrating example results for human evaluations for various text-to-image synthesis models, in accordance with example embodiments.

FIG. 6 is a bar diagram 600 illustrating example results for human evaluations for various text-to-image synthesis models, in accordance with example embodiments. FIG. 6 shows human evaluations comparing XMC-GAN to three models: CP-GAN, SD-GAN, and OP-GAN. Given images (anonymized and randomly ordered) generated from the same caption by the four models, annotators may be asked to rank them from best to worst. Ranking legend 605 indicates the rankings. Realism comparisons 610 and text alignment comparisons 615 may be performed independently. The percentage values for XMC-GAN indicate superior performance for realism comparisons 610 and text alignment comparisons 615. For example, images generated by XMC-GAN are ranked best in 77.3% of realism comparisons 610 as indicated by bar 6B4), and 74.1% of text alignment comparisons 615 (as indicated by bar 6B8). OP-GAN is a distant second, at 9.90% (as indicated by bar 6B3), and 9.70% (as indicated by bar 6B7), respectively. SD-GAN is third, at 9.00% (as indicated by bar 6B2), and 8.68% (as indicated by bar 6B6), respectively. CP-GAN is a fourth, at 3.84% (as indicated by bar 6B1), and 7.52% (as indicated by bar 6B5), respectively. As described herein, XMC-GAN achieves this while being a simpler, one-stage model, whereas OP-GAN is a multi-stage model and needs object bounding boxes.

Figure 7:
FIG. 7 illustrates example images generated by a text-to-image synthesis model, in accordance with example embodiments.

FIG. 7 illustrates example images 700 generated by a text-to-image synthesis model, in accordance with example embodiments. Generated images are for selected examples from COCO-14. First column 7C1 displays captions from MS-COCO. Second column 7C2 displays images generated by OP-GAN, third column 7C3 displays images generated by SD-GAN, fourth column 7C4 displays images generated by CP-GAN, and fifth column 7C5 displays images generated by XMC-GAN. As illustrated, images generated by XMC-GAN are generally of much higher quality and depict clearer scenes.

FIG. 8 illustrates additional example images 800 generated by a text-to-image synthesis model, in accordance with example embodiments. Generated images for selected examples from LN-COCO. First column 8C1 displays captions from LN-COCO. These captions are generally longer than the captions for images in the MS-COCO dataset. Second column 8C2 displays images generated by AttnGAN, third column 8C3 displays images generated by TReCS, and fourth column 8C4 displays images generated by XMC-GAN. As illustrated, images generated by XMC-GAN are generally of much higher quality and depict clearer scenes.

Visual inspection of example images 700 and 800 shows the large quality improvement. XMC-GAN's images are of higher fidelity compared to images generated by other models, and depict clearer objects, and more coherent scenes. This is also generally the case for more random samples.

Referring again to FIG. 5, comprehensive COCO-14 results for automated metrics are displayed. XMC-GAN dramatically improves FID (displayed in third column 5C3) from 24.70 (displayed in fifth row 5R5) to 9.33 (displayed in eighth row 5R8), a 62.2% relative improvement over the next best model, OP-GAN. XMC-GAN also outperforms others (71% vs. 59%) for R-precision (displayed in fourth column 5C4) computed with independently trained encoders in XMC-GAN, indicating a large improvement in fidelity of generated images to the captions they are conditioned on, and consistent with human judgments. Although CP-GAN (displayed in seventh row 5R7) achieves higher IS and SOA scores, human evaluations and visual inspection of randomly selected images indicates XMC-GAN's image quality is much higher than CP-GAN's. This may be because IS and SOA do not penalize intra-class mode dropping (low diversity within a class). Accordingly, a model that generates one "perfect" sample for each class can achieve good scores on IS and SOA. The results described herein are consistent with other results in existing literature that indicates that FID may be a more reliable metric for measuring text-to-image synthesis quality.

LN-COCO

Localized Narratives (LN) contains much longer descriptions, which increases the difficulty of text-to-image synthesis.

FIG. 9 is a table 900 illustrating example comparative results for various text-to-image synthesis models, in accordance with example embodiments. FIG. 9 shows a comparison of XMC-GAN on LN-COCO. SOA metrics together with others may be computed from 30,000 random examples. Table 900 displays a model name in first column 9C1, IS values are displayed in second column 9C2, FID in third column 9C3, R-precision in fourth column 9C4, SOA-C in fifth column 9C5, and SOA-I in sixth column 9C6. As illustrated, results for XMC-GAN (displayed in fourth row 9R4) provide significant improvements over existing models. For example, compared to TReCS (results displayed in third row 9R3), XMC-GAN improves IS and FID, by 7.07 (=28.37−21.30) and 34.58 (=|14.12−48.70|), respectively. XMC-GAN also improves R-precision by 23.04% (=|66.92−43.88|) over AttnGAN (results displayed in second row 9R2), indicating much better text alignment. This is supported by a qualitative comparison of randomly selected outputs: XMC-GAN's images are clearer and more coherent (see, for example, images displayed in FIGS. 7 and 8).

LN-OpenImages

In some embodiments, XMC-GAN may be trained on the Open Images dataset, which is much more challenging than MS-COCO due to greater diversity in images and descriptions. XMC-GAN achieves an IS of 24.90, HD of 26.91, and R-precision of 57.55, and manages to generate high quality images. The neural network described herein, XMC-GAN, is a first of a kind text-to-image generation model that may be trained and evaluated for Open Images, XMC-GAN is able to generate high quality results for images in LN-OpenImages, and sets a strong benchmark for this very challenging task.

Experiments—Ablations

In some embodiments, different components of XMC-GAN may be evaluated, and their impact may be analyzed.

FIG. 10 is a table 1000 illustrating example ablation results with different contrastive losses, in accordance with example embodiments. FIG. 10 summarizes the ablations on the COCO-14 validation set. In first column 10C1, "S" indicates the sentence-image loss. In second column 10C2, "W" indicates the region-word loss. In third column 10C3, "I" indicates the image-image loss. In third column 10C3, the letter "D" (in rows 10R4, and 10R8) represents using a discriminator to extract image features, and "VGG" (in rows 10R5, and 10R9) represents using a pre-trained VGG network to extract image features, and "D+VGG" (in rows 10R6, and 10R10) represents using a discriminator and a pre-trained VGG network to extract image features. To study the effects of each contrastive loss component used in XMC-GAN, four losses may be evaluated: (i) image-sentence, indicated as "S" in first column 10C1, (ii) region-word, indicated as "W" in second column 10C2, (iii) itnage-image using discriminator features, indicated as "I" in third column 10C3, and (iv) image-image using VGG features also indicated as "I" in third column 10C3. For loss (iii), the discriminator encoder projection (indicated by "D" in third column 10C3) may be utilized to extract image features. For loss (iv), image features may be extracted from a VGG-19 network pre-trained on the imageNet dataset. In table 1000, IS values are displayed in fourth column 10C4, FID in fifth column 1005, R-precision in sixth column 1006, SOA-C in seventh column 10C7, and SOA-I in eighth column 10C8.

Individual Contrastive Losses

Referring again to FIG. 10, as indicated, using any of the contrastive losses improves all metrics compared to the baseline displayed in first row 10R1. Experimentation generally indicates that including any contrastive loss leads to significant improvements in training stability. For example, as displayed in fifth column 1005, a significant improvement may result from the inter-modal image-sentence, and region-word contrastive losses, which improve FID from 39.28 (displayed in first row 10R1 for the baseline) to 19.25 (displayed in row 10R2 for sentence-image loss "S") and 24.38 (displayed in row 10R3 for region-word loss "W"), respectively. This is much larger compared to the image-image intra-modal contrastive losses. For example, including the loss from the discriminator feature encoder ("D") only improves FID to 29.71, as displayed in row 10R4. These ablations highlight the effectiveness of inter-modal contrastive losses. As the results indicate, sentence and word contrastive losses each greatly improve the text-alignment metrics, as well as the image quality.

Combined Contrastive Losses

Combining contrastive losses provides further gains. For example, using both image-sentence "S" and region-word "W" losses achieves better performance (e.g., FID of 14.25 as displayed in row 10R7) than alone (e.g., FID of 19.25 as displayed in row 10R2, and 24.38 as displayed in row 10R3, respectively). This demonstrates that local and global conditions are complementary. Moreover, using both inter-modal losses (sentence and words) outperforms the intra-modal losses ("D+VGG"), for which FID scores are 14.25 (as displayed in row 10R7), and 21.14 (displayed in row 10R6), respectively. These results further emphasize the effectiveness of cross-modal contrastive learning. Nevertheless, the inter-modal and intra-modal contrastive losses also complement each other. For example, the best FID score appears to be obtained from combining image-sentence, region-word, and image-image (VGG) losses, as displayed in row 10R9. Performance on IS and text alignment further improves when using the image-image (D+VGG) loss, as displayed in row 10R10. In some embodiments, XMC-GAN may be trained with base cha dimension 96 using all four contrastive losses described herein.

Attentional Self-Modulation

In some embodiments, two generator setups may be compared, for example, (1) with self-modulation layers in all residual blocks, and (2) with attentional self-modulation layers for blocks with input resolution larger than 16×16. FIG. 11 is a table 1100 illustrating example comparative results for different modulation layers, in accordance with example embodiments. First column 11C1 displays a modulation type, IS values are displayed in second column 11C2, FID in third column 11C3, R-precision in fourth column 11C4, SOA-C in fifth column 11C5, and SOA-I in sixth column 11C6. Table 1100 shows that the proposed attentional self-modulation layer (with results displayed in row 11R2) outperforms self-modulation (with results displayed in row 11R1) on all metrics.

Loss Types

A frequently used loss function in generative models is the $l_2$ loss over VGG outputs between generated images and corresponding real images. This is also commonly known as a perceptual loss. FIG. 12 is a table 1200 illustrating example comparative results for different VGG losses, in accordance with example embodiments. First column 12C1 displays a type of VGG loss, IS values are displayed in second column 12C2, FID in third column 12C3, R-precision in fourth column 12C4, SOA-C in fifth column 12C5, and SOA-I in sixth column 12C6. Table 1200 shows that contrastive losses (with results displayed in row 12R2) outperform such perceptual $l_2$ loss (with results displayed in row 12R1). This demonstrates that repelling mismatched samples may be more effective than simply pulling together aligned samples. Given such superior performance, replacing perceptual losses with contrastive losses may improve other generative tasks.

Deeper Contrastive Heads

In unsupervised representation learning, adding non-linear layers generally improves performance. To study this, a depth of the projection head in the discriminator (e.g., discriminator 300) may be increased. FIGS. 13 and 14 are graphs 1300 and 1400, respectively, illustrating example comparative results for different contrastive heads, in accordance with example embodiments. Training curves for FID and contrastive accuracy on generated images are in FIGS. 13 and 14, across one thousand (1000) epochs. As indicated in graph 1300, using no additional projection layers (represented by graph indicated by arrow 1305) provides the best FID (e.g., 12.61, compared to 19.42 of the 2-layer MLP, as represented by graph indicated by arrow 1315). A linear projection layer, represented by graph indicated by arrow 1310, appears to provide the highest FID, indicating a worse performance.

Moreover, as indicated in graph 1400, the contrastive accuracy appears to increase on generated images (from 76.56% to 88.55%) when more layers are added to the projection head. For example, using no additional projection layers (represented by graph indicated by arrow 1405) provides the best FID, a 2-layer MLP represented by graph indicated by arrow 1415 provides higher FIDS, whereas a linear projection layer, represented by graph indicated by arrow 1410, appears to provide the highest FID, indicating a worse performance. These results may be due to the discriminator overfilling to the contrastive learning task in this configuration, resulting in poorer performance on the adversarial task as a critic, and hence displaying a worse performance as a supervisory signal for the generator.

Training Machine Learning Models for Generating Inferences/Predictions

Figure 15:
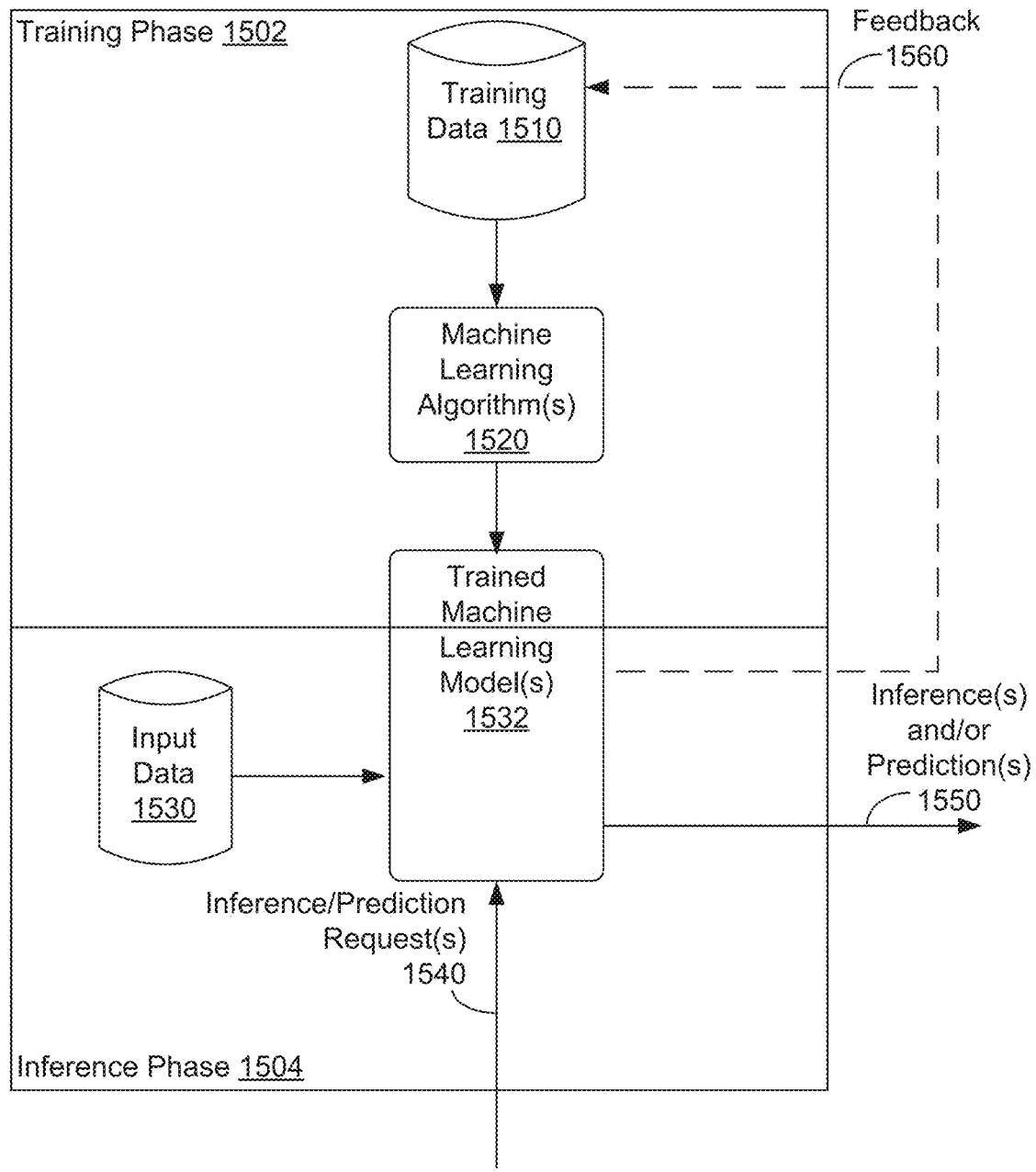
FIG. 15 is a diagram illustrating training and inference phases of a machine learning model, in accordance with example embodiments.

FIG. 15 shows diagram 1500 illustrating a training phase 1502 and an inference phase 1504 of trained machine learning models) 1532, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 15 shows training phase 1502 where machine learning algorithm(s) 1520 are being trained on training data 1510 to become trained machine learning model(s) 1532. Then, during inference phase 1504, trained machine learning model(s) 1532 can receive input data 1530 and one or more inference/prediction requests 1540 (perhaps as part of input data 1530) and responsively provide as an output one or more inferences and/or prediction(s) 1550.

As such, trained machine learning model(s) 1532 can include one or more models of machine learning algorithm(s) 1520. Machine learning algorithm(s) 1520 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1520 may be supervised or unsupervised, and may implement any suitable combination of online and offline learning.

In some examples, machine learning algorithm(s) 1520 and/or trained machine learning model(s) 1532 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1520 and/or trained machine learning model(s) 1532. In some examples, trained machine learning model(s) 1532 can be trained, reside and execute to provide inferences on a particular computing device, and/or otherwise can make inferences for the particular computing device.

During training phase 1502, machine learning algorithm(s) 1520 can be trained by providing at least training data 1510 as training input using unsupervised, supervised, semi-supervised, and/or reinforcement learning techniques. Unsupervised learning involves providing a portion (or all) of training data 1510 to machine learning algorithm(s) 1520 and machine learning algorithm(s) 1520 determining one or more output inferences based on the provided portion (or all) of training data 1510. Supervised learning involves providing a portion of training data 1510 to machine learning algorithm(s) 1520, with machine learning algorithm(s) 1520 determining one or more output inferences based on the provided portion of training data 1510, and the output inference(s) are either accepted or corrected based on correct results associated with training data 1510. In some examples, supervised learning of machine learning algorithm(s) 1520 can be governed by a set of rules and/or a set of labels for the training input, and the set of rules and/or set of labels may be used to correct inferences of machine learning algorithm(s) 1520.

Semi-supervised learning involves having correct results for part, but not all, of training data 1510. During semi-supervised learning, supervised learning is used for a portion of training data 1510 having correct results, and unsupervised learning is used for a portion of training data 1510 not having correct results. Reinforcement learning involves machine learning algorithm(s) 1520 receiving a reward signal regarding a prior inference, where the reward signal can be a numerical value. During reinforcement learning, machine learning algorithm(s) 1520 can output an inference and receive a reward signal in response, where machine learning algorithm(s) 1520 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1520 and/or trained machine teaming rnodel(s) 1532 can be trained using other machine learning techniques, including but not limited to, incremental learning and curriculum learning.

In some examples, machine learning algorithm(s) 1520 and/or trained machine learning model(s) 1532 can use transfer learning techniques. For example, transfer learning techniques can involve trained machine learning model(s) 1532 being pre-trained on one set of data and additionally trained using training data 1510. More particularly, machine learning algorithm(s) 1520 can be pre-trained on data from one or more computing devices and a resulting trained machine learning model provided to computing device CD1, where CD1 is intended to execute the trained machine learning model during inference phase 1504. Then, during training phase 1502, the pre-trained machine learning model can be additionally trained using training data 1510, where training data 1510 can be derived from kernel and non-kernel data of computing device CD1. This further training of the machine learning algorithm(s) 1520 and/or the pre-trained machine learning model using training data 1510 of computing device CD1's data can be performed using either supervised or unsupervised learning. Once machine learning, algorithm(s) 1520 and/or the pre-trained machine learning model has been trained on at least training data 1510, training phase 1502 can be completed. The trained resulting machine learning model can be utilized as at least one of trained machine learning model(s) 1532.

In particular, once training phase 1502 has been completed, trained machine learning model(s) 1532 can be provided to a computing device, if not already on the computing device. Inference phase 1504 can begin after trained machine learning model(s) 1532 are provided to computing device CD1.

During inference phase 1504, trained machine learning model(s) 1532 can receive input data 1530 and generate and output one or more corresponding inferences and/or prediction(s) 1550 about input data 1530. As such, input data 1530 can be used as an input to trained machine learning model(s) 1532 for providing corresponding inference(s) and/or prediction(s) 1550 to kernel components and non-kernel components. For example, trained machine learning model(s) 1532 can generate inference(s) and/or prediction(s) 1550 in response to one or more inference/prediction requests 1540. In some examples, trained machine teaming model(s) 1532 can be executed by a portion of other software. For example, trained machine learning model(s) 1532 can be executed by an inference or prediction daemon to be readily available to provide inferences and/or predictions upon request. Input data 1530 can include data from computing device CD1 executing trained machine learning model(s) 1532 and/or input data from one or more computing devices other than computing device CD1.

Input data 1530 can include a collection of textual descriptions provided by one or more sources. The collection of textual descriptions can include short sentences, longer paragraphs, and so forth, textual descriptions resident on computing device CD1, and/or other textual descriptions, such as in audio format, transcribed audio format, and so forth. Other types of input data are possible as well.

Inference(s) and/or prediction(s) 1550 can include output images, video frames, output intermediate images and/or video frames, numerical values, and/or other output data produced by trained machine learning model(s) 1532 operating on input data 1530 (and training data 1510). In some examples, trained machine learning model(s) 1532 can use output inference(s) and/or prediction(s) 1550 as input feedback 1560. Trained machine learning model(s) 1532 can also rely on past inferences as inputs for generating new inferences.

A neural network comprising a generator and a discriminator can be an example of machine learning algorithm(s) 1520. After training, the trained version of the neural network can be an example of trained machine learning model(s) 1532. In this approach, an example of the one or more inference/prediction request(s) 1540 can be a request to predict an output image rendition of a scene described in a textual description, and a corresponding example of inferences and/or prediction(s) 1550 can be predicted output image rendition of the scene.

In some examples, one computing device CD_SOLO can include the trained version of the neural network, perhaps after training. Then, computing device CD_SOLO can receive a request to predict an output image rendition, and use the trained version of the neural network to output the image rendition of the scene.

In some examples, two or more computing devices CD_CL1 and CD_SRV can be used to provide output images; e.g., a first computing device CD_CL1 can generate and send requests to predict an output image rendition to a second computing device CD_SRV. Then, CD_SRV can use the trained version of the neural network, to generate the image rendition of the scene, and respond to the requests from CD_CL1 for the image rendition of the scene. Then, upon reception of responses to the requests, CD_CL1 can provide the requested image rendition of the scene e.g., using a user interface and/or a display, a printed copy, an electronic communication, etc.).

Example Data Network

Figure 16:
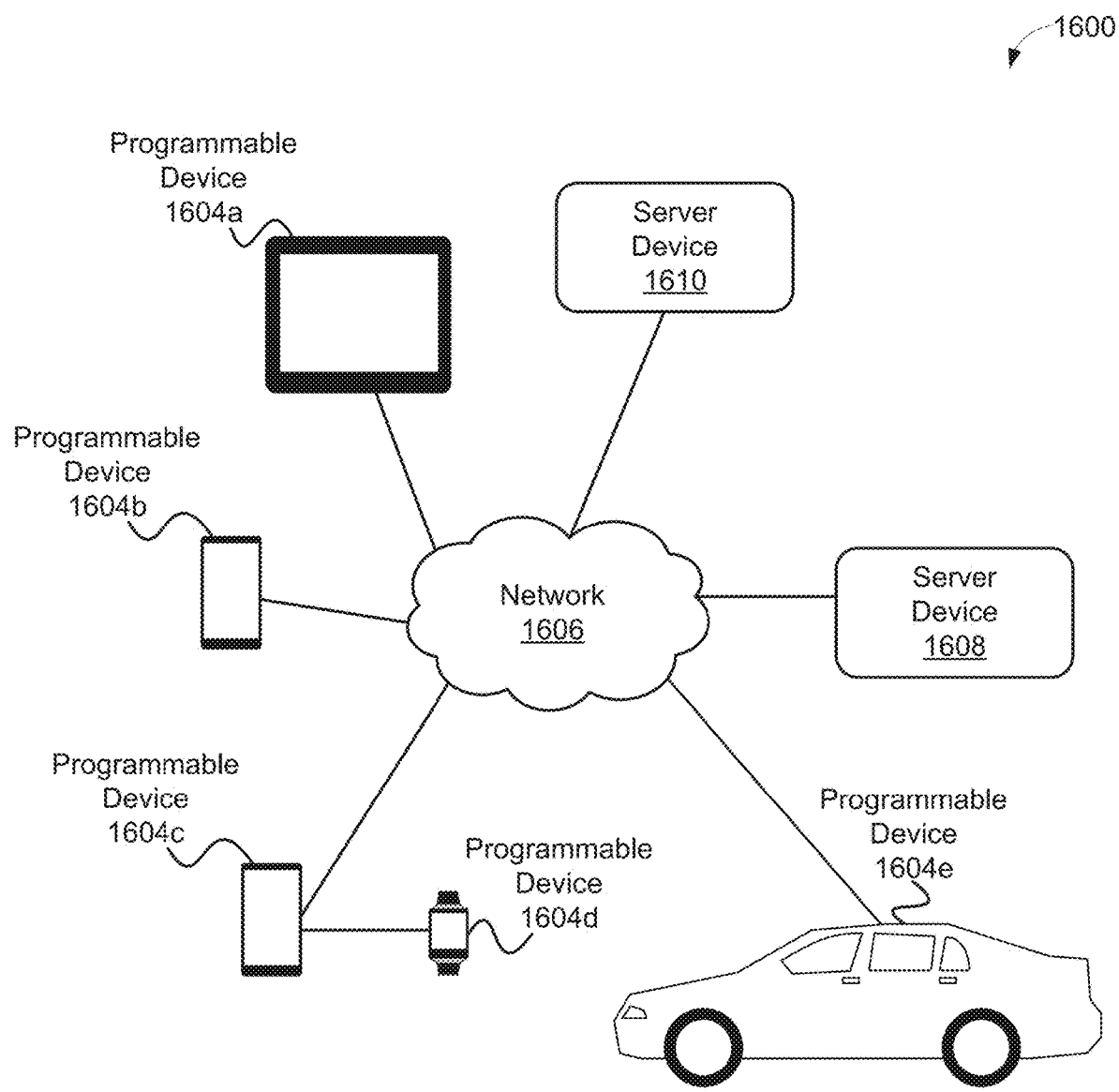
FIG. 16 depicts a distributed computing architecture, in accordance with example embodiments.

FIG. 16 depicts a distributed computing architecture 1600, in accordance with example embodiments. Distributed computing architecture 1600 includes server devices 1608, 1610 that are configured to communicate, via network 1606, with programmable devices 1604a, 1604b, 1604c, 1604d, 1604e. Network 1606 may correspond to a local area network (LAN), a wide area network (WAN), a WLAN, a WWAN, a corporate intranet, the public Internet, or any other type of network configured to provide a communications path between networked computing devices. Network 1606 may also correspond to a combination of one or more LANs, WANs, corporate intranets, and/or the public Internet.

Although FIG. 16 only shows five programmable devices, distributed application architectures may serve tens, hundreds, or thousands of programmable devices. Moreover, programmable devices 1604a, 1604b, 1604c, 1604d, 1604e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1604a, 1604b, 1604c, 1604e, programmable devices can be directly connected to network 1606. In other examples, such as illustrated by programmable device 1604d, programmable devices can be indirectly connected to network 1606 via an associated computing device, such as programmable device 1604c. In this example, programmable device 1604c can act as an associated computing device to pass electronic communications between programmable device 1604d and network 1606. In other examples, such as illustrated by programmable device 1604e, a computing device can be part of and/or inside a vehicle, such as a car, a truck, a bus, a boat or ship, an airplane, etc. In other examples not shown in FIG. 16, a programmable device can be both directly and indirectly connected to network 1606.

Server devices 1608, 1610 can be configured to perform one or more services, as requested by programmable devices 1604a-1604e. For example, server device 1608 and/or 1610 can provide content to programmable devices 1604a-1604e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1608 and/or 1610 can provide programmable devices 1604a-1604e with access to software for database, search, computation, graphical, audio, video, World Wide Web/Internet utilization and/or other functions. Many other examples of server devices are possible as well.

Computing Device Architecture

Figure 17:
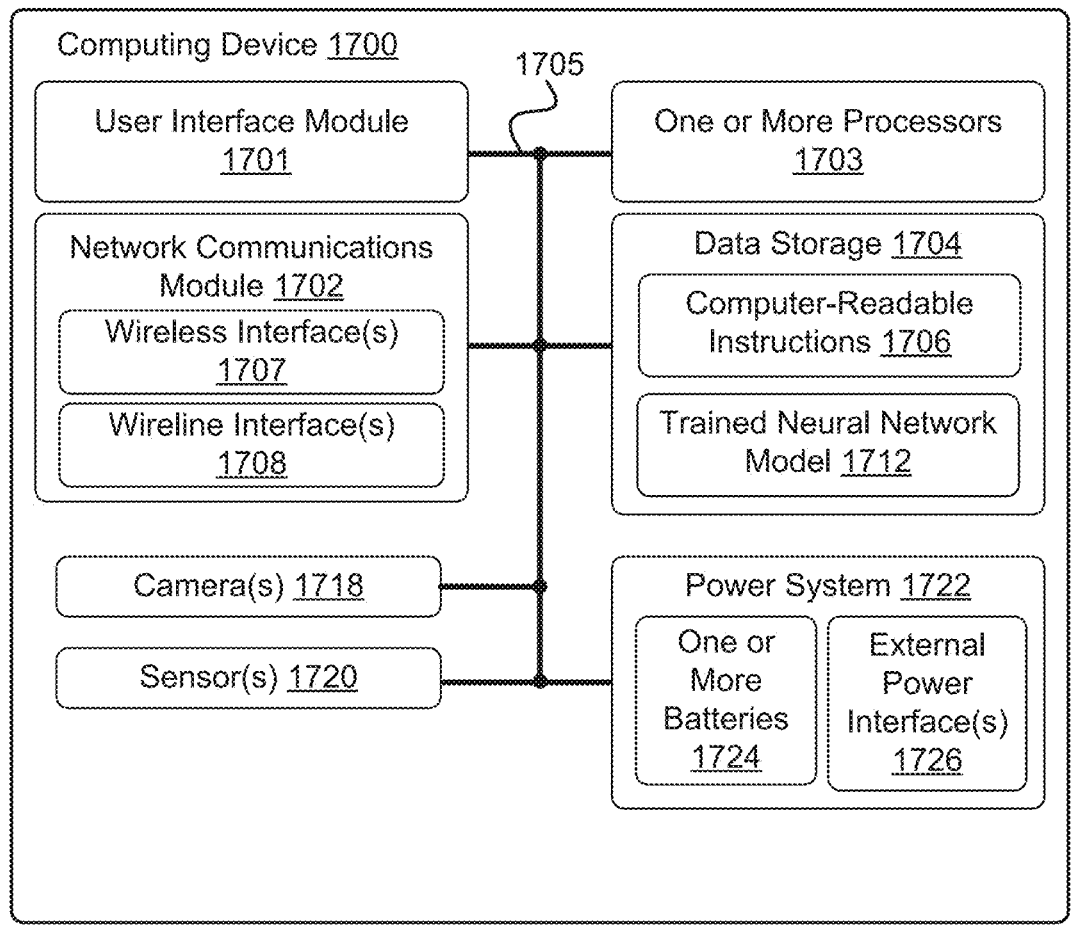
FIG. 17 is a block diagram of a computing device, in accordance with example embodiments.

FIG. 17 is a block diagram of an example computing device 1700, in accordance with example embodiments. In particular, computing device 1700 shown in FIG. 17 can be configured to perform at least one function of and/or related to an XMC-GAN network, method 1900, and/or method 2000.

Computing device 1700 may include a user interface module 1701, a network communications module 1702, one or more processors 1703, data storage 1704, one or more camera(s) 1718, one or more sensors 1720, and power system 1722, all of which may be linked together via a system bus, network, or other connection mechanism 1705.

User interface module 1701 can be operable to send data to and/or receive data from external user input/output devices. For example, user interface module 1701 can be configured to send and/or receive data to and/or from user input devices such as a touch screen, a computer mouse, a keyboard, a keypad, a touch pad, a track ball, a joystick, a voice recognition module, and/or other similar devices. User interface module 1701 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1701 can also be configured to generate audible outputs, with devices such as a speaker, speaker jack, audio output port, audio output device, earphones, and/or other similar devices. User interface module 1701 can further be configured with one or more haptic devices that can generate haptic outputs, such as vibrations and/or other outputs detectable by touch and/or physical contact with computing device 1700. In some examples, user interface module 1701 can be used to provide a graphical user interface (GUI) for utilizing computing device 1700, such as, for example, a graphical user interface of a mobile phone device.

Network communications module 1702 can include one or more devices that provide one or more wireless interface(s) 1707 and/or one or more wireline interface(s) 1708 that are configurable to communicate via a network. Wireless interface(s) 1707 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1702 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1703 can include one or more general purpose processors, and/or one or more special purpose processors (e.g., digital signal processors, tensor processing units (TPUs), graphics processing units (GPUs), application specific integrated circuits, etc.). One or more processors 1703 can be configured to execute computer-readable instructions 1706 that are contained in data storage 1704 and/or other instructions as described herein.

Data storage 1704 can include one or more non-transitory computer-readable storage media that can be read and/or accessed by at least one of one or more processors 1703. The one or more computer-readable storage media can include volatile and/or non-volatile storage components, such as optical, magnetic, organic, or other memory or disc storage, which can be integrated in whole or in part with at least one of one or more processors 1703. In some examples, data storage 1704 can be implemented using a single physical device (e.g., one optical, magnetic, organic or other memory or disc storage unit), while in other examples, data storage 1704 can be implemented using two or more physical devices.

Data storage 1704 can include computer-readable instructions 1706 and perhaps additional data. In some examples, data storage 1704 can include storage required to perform at least part of the herein-described methods, scenarios, and techniques and/or at least part of the functionality of the herein-described devices and networks. In some examples, data storage 1704 can include storage for a trained neural network model 1712 (e.g., a model of trained neural networks such as XMC-GAN). In particular of these examples, computer-readable instructions 1706 can include instructions that, when executed by one or more processors 1703, enable computing device 1700 to provide for some or all of the functionality of trained neural network model 1712.

In some examples, computing device 1700 can include one or more camera(s) 1718. Camera(s) 1718 can include one or more image capture devices, such as still and/or video cameras, equipped to capture light and record the captured light in one or more images; that is, camera(s) 1718 can generate image(s) of captured light. The one or more images can be one or more still images and/or one or more images utilized in video imagery. Camera(s) 1718 can capture light and/or electromagnetic radiation emitted as visible light, infrared radiation, ultraviolet light, and/or as one or more other frequencies of light.

In some examples, computing device 1700 can include one or more sensors 1720. Sensors 1720 can be configured to measure conditions within computing device 1700 and/or conditions in an environment of computing device 1700 and provide data about these conditions. For example, sensors 1720 can include one or more of: (i) sensors for obtaining data about computing device 1700, such as, but not limited to, a thermometer for measuring a temperature of computing device 1700, a battery sensor for measuring power of one or more batteries of power system 1722, and/or other sensors measuring conditions of computing device 1700; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1700, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1700, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1700, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1720 are possible as well.

Power system 1722 can include one or more batteries 1724 and/or one or more external power interfaces 1726 for providing electrical power to computing device 1700. Each battery of the one or more batteries 1724 can, when electrically coupled to the computing device 1700, act as a source of stored electrical power for computing device 1700. One or more batteries 1724 of power system 1722 can be configured to be portable. Some or all of one or more batteries 1724 can be readily removable from computing device 1700. In other examples, some or all of one or more batteries 1724 can be internal to computing device 1700, and so may not be readily removable from computing device 1700. Some or all of one or more batteries 1724 can be rechargeable. For example, a rechargeable battery can be recharged via a wired connection between the battery and another power supply, such as by one or more power supplies that are external to computing device 1700 and connected to computing device 1700 via the one or more external power interfaces. In other examples, some or all of one or more batteries 1724 can be non-rechargeable batteries.

One or more external power interfaces 1726 of power system 1722 can include one or more wired-power interfaces, such as a USB cable and/or a power cord, that enable wired electrical power connections to one or more power supplies that are external to computing device 1700. One or more external power interfaces 1726 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1726, computing device 1700 can draw electrical power from the external power source the established electrical power connection. In some examples, power system 1722 can include related sensors, such as battery sensors associated with the one or more batteries or other types of electrical power sensors.

Cloud-Based Servers

Figure 18:
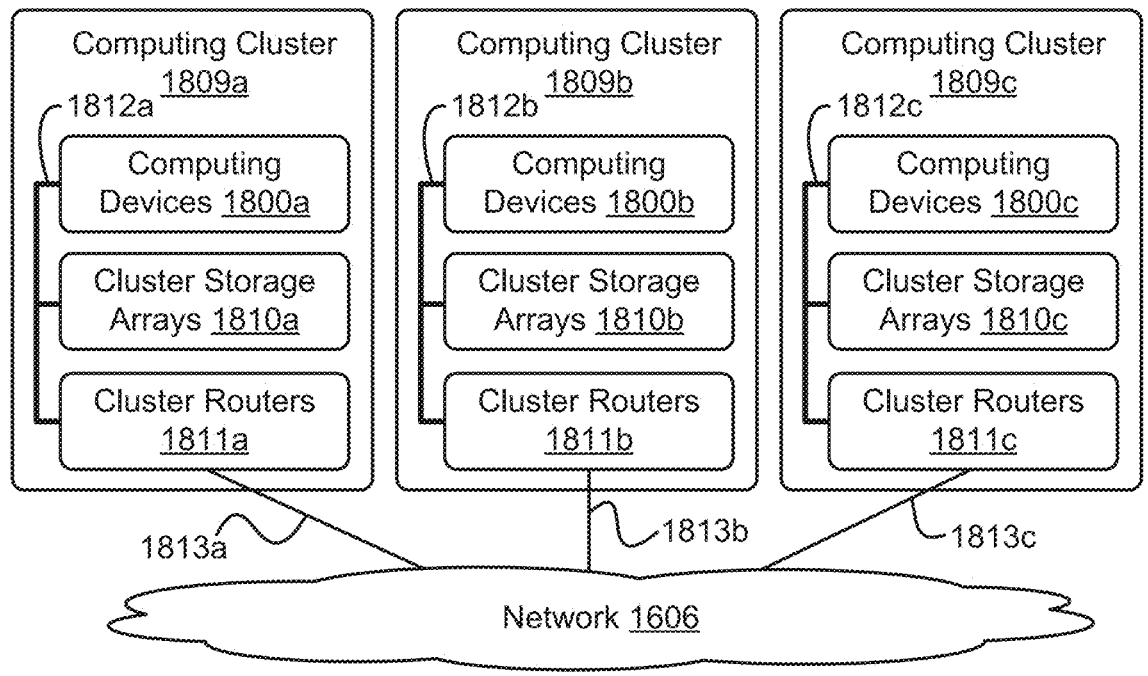
FIG. 18 depicts a network of computing clusters arranged as a cloud-based server system, in accordance with example embodiments.

FIG. 18 depicts a cloud-based server system in accordance with an example embodiment. In FIG. 18, functionality of a neural network such as XMC-GAN, and/or a computing device can be distributed among computing clusters 1809a, 1809b, and 1809c. Computing cluster 1809a can include one or more computing devices 1800a, cluster storage arrays 1810a, and cluster routers 1811a connected by a local cluster network 1812a. Similarly, computing cluster 1809b can include one or more computing devices 1800b, cluster storage arrays 1810b, and cluster routers 1811b connected by a local cluster network 1812b. Likewise, computing cluster 1809c can include one or more computing devices 1800c, cluster storage arrays 1810c, and cluster routers 1811c connected by a local cluster network 1812c.

In some embodiments, computing clusters 1809a, 1809b, and 1809c can be a single computing device residing in a single computing center. In other embodiments, computing clusters 1809a, 1809b, and 1809c can include multiple computing devices in a single computing center, or even multiple computing devices located in multiple computing centers located in diverse geographic locations. For example, FIG. 18 depicts each of computing clusters 1809a, 1809b, 1809c residing in different physical locations.

In some embodiments, data and services at computing clusters 1809a, 1809b, 1809c can be encoded as computer readable information stored in non-transitory, tangible computer readable media (or computer readable storage media) and accessible by other computing devices. In some embodiments, computing clusters 1809a, 1809b, 1809c can be stored on a single disk drive or other tangible storage media, or can be implemented on multiple disk drives or other tangible storage media located at one or more diverse geographic locations.

In some embodiments, each of computing clusters 1809a, 1809b, and 1809c can have an equal amber of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1809a, for example, computing devices 1800a can be configured to perform various computing tasks of a conditioned, axial self-attention based neural network, and/or a computing device. In one embodiment, the various functionalities of a neural network, and/or a computing device can be distributed among one or more of computing devices 1800a, 1800b, and 1800c. Computing devices 1800b and 1800c in respective computing clusters 1809b and 1809c can be configured similarly to computing devices 1800a in computing cluster 1809a. On the other hand, in some embodiments, computing devices 1800a, 1800b, and 1800c can be configured to perform different functions.

In some embodiments, computing tasks and stored data associated with a neural network, and/or a computing device can be distributed across computing devices 1800a, 1800b, and 1800c based at least in part on the processing requirements of a neural network, and/or a computing device, the processing capabilities of computing devices 1800a, 1800b, 1800c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1810a, 1810b, 1810c of computing clusters 1809a, 1809b, and 1809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1800a, 1800b, 1800c of computing clusters 1809a, 1809b, 1809c, various active portions and/or backup portions of these components can be distributed across cluster storage arrays 1810a, 1810b, 1810c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1811a, 1811b, 1811c in computing clusters 1809a, 1809b, and 1809c can include networking equipment configured to provide internal and external communications for the computing clusters. For example, cluster routers 1811a in computing cluster 1809a can include one or more internet switching and routing devices configured to provide (i) local area network communications between computing devices 1800a and cluster storage arrays 1810a via local cluster network 1812a, and (ii) wide area network communications between computing cluster 1809a and computing clusters 1809b and 1809c via wide area network link 1813a to network 1606. Cluster routers 1811b and 1811c can include network equipment similar to cluster routers 1811a, and cluster routers 1811b and 1811c can perform similar networking functions for computing clusters 1809b and 1809b that cluster routers 1811a perform for computing cluster 1809a.

In some embodiments, the configuration of cluster routers 1811a, 1811b, 1811c can be based at least in part on the data communication requirements of the computing devices and cluster storage arrays, the data communications capabilities of the network equipment in cluster routers 1811a, 1811b, 1811c, the latency and throughput of local cluster networks 1812a, 1812b, 1812c, the latency, throughput, and cost of wide area network links 1813a, 1813b, 1813c, and/or other factors that can contribute to the cost, speed, fault-tolerance, resiliency, efficiency and/or other design criteria of the moderation system architecture.

Example Methods of Operation

FIG. 19 is a flowchart of a method 1900, in accordance with example embodiments. Method 1900 can be executed by a computing device, such as computing device 1700. Method 1900 can begin at block 1910, where the method involves receiving, by the computing device, training data comprising a plurality of textual descriptions, and one or more image renditions associated with each of the plurality of textual descriptions.

At block 1920, the method involves training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair. In such embodiments, the training of the neural network involves determining a plurality of contrastive losses corresponding to the plurality of corresponding pairs, and wherein the mutual information is based on the plurality of contrastive losses.

At block 1930, the method involves outputting the trained neural network for text-to-image generation.

In some embodiments, the plurality of contrastive losses is based on normalized temperature-scaled cross-entropy losses.

In some embodiments, the neural network is a generative adversarial network including a one-stage generator trained to generate the output image rendition of the scene. The image-to-image pair includes an image rendition of the one or more image renditions, and an image generated by the generator.

In some embodiments, the text-to-image pair includes an image and an associated textual description.

In some embodiments, the text-to-image pair includes portions of an image and corresponding portions of an associated textual description.

In some embodiments, the mutual information is based on a contrastive loss between: (a) an image and an associated textual description, (b) a known image and a predicted image for a same associated textual description, and (c) portions of an image and corresponding portions of an associated textual description.

Some embodiments involve determining a soft-attention between a particular portion of an image and a particular portion of a textual description.

In some embodiments, the neural network is a generative adversarial network comprising a discriminator trained to generate, for an image, one or more of: a global feature representation or a local feature representation. In such embodiments, the discriminator generates the local feature representation for the image. A dimension of the local feature representation may match a dimension for a local feature representation of an associated textual description.

In some embodiments, the training of the neural network involves generating one or more object level pseudo-labels for an image based on the text-to-image pair.

In some embodiments, the training of the neural network to cause two image renditions associated with a same textual description to attract each other and two image renditions associated with different textual descriptions to repel each other involves determining similarity measures between pairs of image renditions. Such embodiments involve training the neural network to cause a first similarity measure for two image renditions associated with the same textual description to be less than a first threshold value. Such embodiments also involve training the neural network to cause a second similarity measure for two image renditions associated with different textual descriptions to be greater than a second threshold value.

FIG. 20 is another flowchart of a method 2000, in accordance with example embodiments. Method 2000 can be executed by a computing device, such as computing device 1700. Method 2000 can begin at block 2010, where the method involves receiving, by a computing device, a particular textual description of a scene.

At block 2020, the method involves applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair.

At block 2030, the method involves predicting the output image rendition of the scene.

In some embodiments, the neural network may be a generative adversarial network comprising a one-stage generator trained to generate the output image rendition of the scene.

In some embodiments, the generator includes an attentional self-modulation layer that generates a context representation for a portion of the particular textual description. The context representation is indicative of a contextual relationship of the portion to the particular textual description.

Some embodiments involve obtaining, from a deep bidirectional transformer, a global feature embedding for the particular textual description, and a local feature embedding for a portion of the particular textual description.

In some embodiments, the scene describes virtual reality or augmented reality, and the predicting of the output image rendition involves generating an image rendition of the scene as described, in a format suitable for virtual reality or augmented reality.

Some embodiments involve receiving, by the computing device, an image description in audio format, and wherein the particular textual description is a transcribed version of the audio format. Such embodiments can also involve receiving, by the computing device, an image style for the image description. The predicting of the output image rendition involves generating the output image rendition to conform to the image style.

In some embodiments, the particular textual description describes a plurality of scenes, and the predicting of the output image rendition involves generating a plurality of video frames of video content corresponding to the respective plurality of scenes.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein, it will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method, comprising:
receiving, by a computing device, training data comprising a plurality of textual descriptions, and one or more image renditions associated with each of the plurality of textual descriptions;
training a neural network for text-to-image generation based on the training data, wherein the neural network is trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair, wherein the training of the neural network further comprises determining a plurality of contrastive losses corresponding to the plurality of corresponding pairs, and wherein the mutual information is based on the plurality of contrastive losses; and
outputting the trained neural network for text-to-image generation.

2. The computer-implemented method of claim 1, wherein the plurality of contrastive losses is based on normalized temperature-scaled cross-entropy losses.

3. The computer-implemented method of claim 1, wherein the neural network is a generative adversarial network comprising a generator, and wherein the image-to-image pair comprises an image rendition of the one or more image renditions, and an image generated by the generator.

4. The computer-implemented method of claim 1, wherein the text-to-image pair comprises an image and an associated textual description.

5. The computer-implemented method of claim 1, wherein the text-to-image pair comprises portions of an image and corresponding portions of an associated textual description.

6. The computer-implemented method of claim 1, wherein the mutual information is based on a contrastive loss between: (a) an image and an associated textual description, (b) known image and a predicted image for a same associated textual description, and (c) portions of an image and corresponding portions of an associated textual description.

7. The computer-implemented method of claim 1, further comprising:
determining a soft-attention between a particular portion of an image and a particular portion of a textual description.

8. The computer-implemented method of claim 1, wherein the neural network is a generative adversarial network comprising a discriminator trained to generate, for an image, one or more of: a global feature representation or a local feature representation.

9. The computer-implemented method of claim 8, wherein the discriminator generates the local feature representation for the image, and wherein a dimension of the local feature representation matches a dimension for a local feature representation of an associated textual description.

10. The computer-implemented method of claim 1, wherein the training of the neural network comprises generating one or more object level pseudo-labels for an image based on the text-to-image pair.

11. The computer-implemented method of claim 1, wherein the training of the neural network to cause two image renditions associated with a same textual description to attract each other and two image renditions associated with different textual descriptions to repel each other further comprises:
determining similarity measures between pairs of image renditions;
training the neural network to cause a first similarity measure for two image renditions associated with the same textual description to be less than a first threshold value; and
training the neural network to cause a second similarity measure for two image renditions associated with different textual descriptions to be greater than a second threshold value.

12. A computer-implemented method, comprising:
receiving, by a computing device, a particular textual description of a scene;
applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and
predicting the output image rendition of the scene.

13. The computer-implemented method of claim 12, wherein the neural network is a generative adversarial network comprising a one-stage generator trained to generate the output image rendition of the scene.

14. The computer-implemented method of claim 13, wherein the generator comprises an attentional self-modulation layer that generates a context representation for a portion of the particular textual description, and wherein the context representation is indicative of a contextual relationship of the portion to the particular textual description.

15. The computer-implemented method of claim 12, further comprising:
obtaining, from a deep bidirectional transformer, a global feature embedding for the particular textual description, and a local feature embedding for a portion of the particular textual description.

16. The computer-implemented method of claim 12, wherein the scene describes virtual reality or augmented reality, and wherein the predicting of the output image rendition further comprising:
generating an image rendition of the scene as described, in a format suitable for virtual reality or augmented reality.

17. The computer-implemented method of claim 12, further comprising:
receiving, by the computing device, an image description in audio format, and wherein the particular textual description is a transcribed version of the audio format.

18. The computer-implemented method of claim 17, further comprising:
receiving, by the computing device, an image style for the image description, and
wherein the predicting of the output image rendition comprises generating the output image rendition to conform to the image style.

19. The computer-implemented method of claim 12, wherein the particular textual description describes a plurality of scenes, and the predicting of the output image rendition further comprising:
generating a plurality of video frames of video content corresponding to the respective plurality of scenes.

20. A computing device, comprising:
one or more processors; and
data storage, wherein the data storage has stored thereon computer-executable instructions that, when executed by the one or more processors, cause the computing device to carry out operations comprising:
receiving, by the computing device, a particular textual description of a scene;
applying a neural network for text-to-image generation to generate an output image rendition of the scene, the neural network having been trained to cause two image renditions associated with a same textual description to attract each other and two image renditions associated with different textual descriptions to repel each other based on mutual information between a plurality of corresponding pairs, wherein the plurality of corresponding pairs comprise an image-to-image pair and a text-to-image pair; and
predicting the output image rendition of the scene.

* * * * *